(12) United States Patent
Landis et al.

(10) Patent No.: US 11,856,568 B2
(45) Date of Patent: Dec. 26, 2023

(54) ASSISTED BEAM MANAGEMENT BETWEEN FREQUENCY BANDS

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 16/951,696

(22) Filed: Nov. 18, 2020

(65) Prior Publication Data

US 2022/0159636 A1 May 19, 2022

(51) Int. Cl.
*H04W 72/044* (2023.01)
*H04W 72/0453* (2023.01)
*H04B 7/0426* (2017.01)

(52) U.S. Cl.
CPC .......... *H04W 72/046* (2013.01); *H04B 7/043* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2014/0148107 A1 | 5/2014 | Maltsev et al. | |
| 2016/0020876 A1 | 1/2016 | Raghavan et al. | |
| 2018/0269945 A1* | 9/2018 | Zhang | H04B 7/0695 |
| 2018/0287683 A1* | 10/2018 | Subramanian | H04L 5/0048 |
| 2018/0368004 A1 | 12/2018 | Subramanian et al. | |
| 2019/0222279 A1* | 7/2019 | Xi | H04B 7/0689 |
| 2019/0245606 A1* | 8/2019 | Ha | H04B 7/066 |
| 2020/0136715 A1 | 4/2020 | Venugopal et al. | |
| 2021/0306964 A1* | 9/2021 | Yuan | H04L 5/0094 |
| 2021/0391911 A1* | 12/2021 | Hoydis | H04B 7/088 |
| 2022/0272643 A1* | 8/2022 | Harada | H04W 56/00 |

FOREIGN PATENT DOCUMENTS

| | | | | |
|---|---|---|---|---|
| WO | 2018171860 A1 | | 9/2018 | |
| WO | WO-2021083866 A1 | * | 5/2021 | ........... H04B 7/0417 |

OTHER PUBLICATIONS

International Search Report and Written Opinion—PCT/US2021/056340—ISA/EPO—dated Apr. 19, 2022.
Partial International Search Report—PCT/US2021/056340—ISA/EPO—dated Feb. 23, 2022.

* cited by examiner

*Primary Examiner* — The Hy Nguyen
(74) *Attorney, Agent, or Firm* — & Loza LLP/QUALCOMM Incorporated

(57) ABSTRACT

Aspects relate to assisted beam management between frequency bands that each utilize spatially directional beams. A user equipment (UE) may be configured to receive a plurality of first transmit beams on each of a plurality of first receive beams within a first frequency band to select at least one first beam pair link in the first frequency band. The UE may then receive a plurality of second transmit beams on each of a plurality of second receive beams within a second frequency band different than the first frequency band to select a second beam pair link in the second frequency band on which to communicate with a transmission and reception point. Each of the second transmit or receive beams has a respective spatial direction within a spatial direction of at least one of the first transmit or receive beams of the first beam pair links.

38 Claims, 15 Drawing Sheets

ASSISTED BEAM MANAGEMENT BETWEEN FREQUENCY BANDS

INTRODUCTION

The technology discussed below relates generally to wireless communication networks, and more particularly, to beam acquisition and tracking in beam-based communication scenarios.

In wireless communication systems, such as those specified under standards for 5G New Radio (NR), a base station and user equipment (UE) may utilize beamforming for communication of signals therebetween. Beamforming is a signal processing technique used with an antenna array for spatially directional signal transmission and/or reception. Beamforming may be used for downlink channels communicated from the base station to the UE and/or uplink channels communicated from the UE to the base station.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method includes receiving a plurality of first transmit beams on each of a plurality of first receive beams within a first frequency band. Each of the plurality of first transmit beams and the plurality of first receive beams are spatially directional beams. The method further includes selecting at least one first beam pair link, each including a respective first transmit beam of the plurality of first transmit beams and a respective first receive beam of the plurality of receive beams. Each first transmit beam of the at least one first beam pair link includes a respective first downlink spatial direction and each first receive beam of the at least one first beam pair link includes a respective first uplink spatial direction. The method further includes receiving a plurality of second transmit beams on each of a plurality of second receive beams within a second frequency band different than the first frequency band. The plurality of second transmit beams each have a respective second downlink spatial direction within at least one of the respective first downlink spatial directions and the plurality of second receive beams each have a respective second uplink spatial direction within at least one of the respective first uplink spatial directions. The method further includes selecting a second beam pair link including a second transmit beam of the plurality of second transmit beams and a second receive beam of the plurality of third receive beams, and communicating with a transmission and reception point (TRP) utilizing the second beam pair link.

Another example provides a UE configured for wireless communication including a memory and a processor coupled to the memory. The processor and the memory can be configured to receive a plurality of first transmit beams on each of a plurality of first receive beams within a first frequency band. Each of the plurality of first transmit beams and the plurality of first receive beams are spatially directional beams. The processor and the memory can further be configured to select at least one first beam pair link, each including a respective first transmit beam of the plurality of first transmit beams and a respective first receive beam of the plurality of receive beams. Each first transmit beam of the at least one first beam pair link includes a respective first downlink spatial direction and each first receive beam of the at least one first beam pair link includes a respective first uplink spatial direction. The processor and the memory can further be configured to receive a plurality of second transmit beams on each of a plurality of second receive beams within a second frequency band different than the first frequency band. The plurality of second transmit beams each have a respective second downlink spatial direction within at least one of the respective first downlink spatial directions and the plurality of second receive beams each have a respective second uplink spatial direction within at least one of the respective first uplink spatial directions. The processor and the memory can further be configured to select a second beam pair link including a second transmit beam of the plurality of second transmit beams and a second receive beam of the plurality of third receive beams, and communicate with a transmission and reception point (TRP) utilizing the second beam pair link.

Another example provides an apparatus configured for wireless communication. The apparatus can include means for receiving a plurality of first transmit beams on each of a plurality of first receive beams within a first frequency band. Each of the plurality of first transmit beams and the plurality of first receive beams are spatially directional beams. The apparatus can further include means for selecting at least one first beam pair link, each including a respective first transmit beam of the plurality of first transmit beams and a respective first receive beam of the plurality of receive beams. Each first transmit beam of the at least one first beam pair link includes a respective first downlink spatial direction and each first receive beam of the at least one first beam pair link includes a respective first uplink spatial direction. The apparatus can further include means for receiving a plurality of second transmit beams on each of a plurality of second receive beams within a second frequency band different than the first frequency band. The plurality of second transmit beams each have a respective second downlink spatial direction within at least one of the respective first downlink spatial directions and the plurality of second receive beams each have a respective second uplink spatial direction within at least one of the respective first uplink spatial directions. The apparatus can further include means for selecting a second beam pair link including a second transmit beam of the plurality of second transmit beams and a second receive beam of the plurality of third receive beams, and means for communicating with a transmission and reception point (TRP) utilizing the second beam pair link.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be

DETAILED DESCRIPTION

Figure 1:
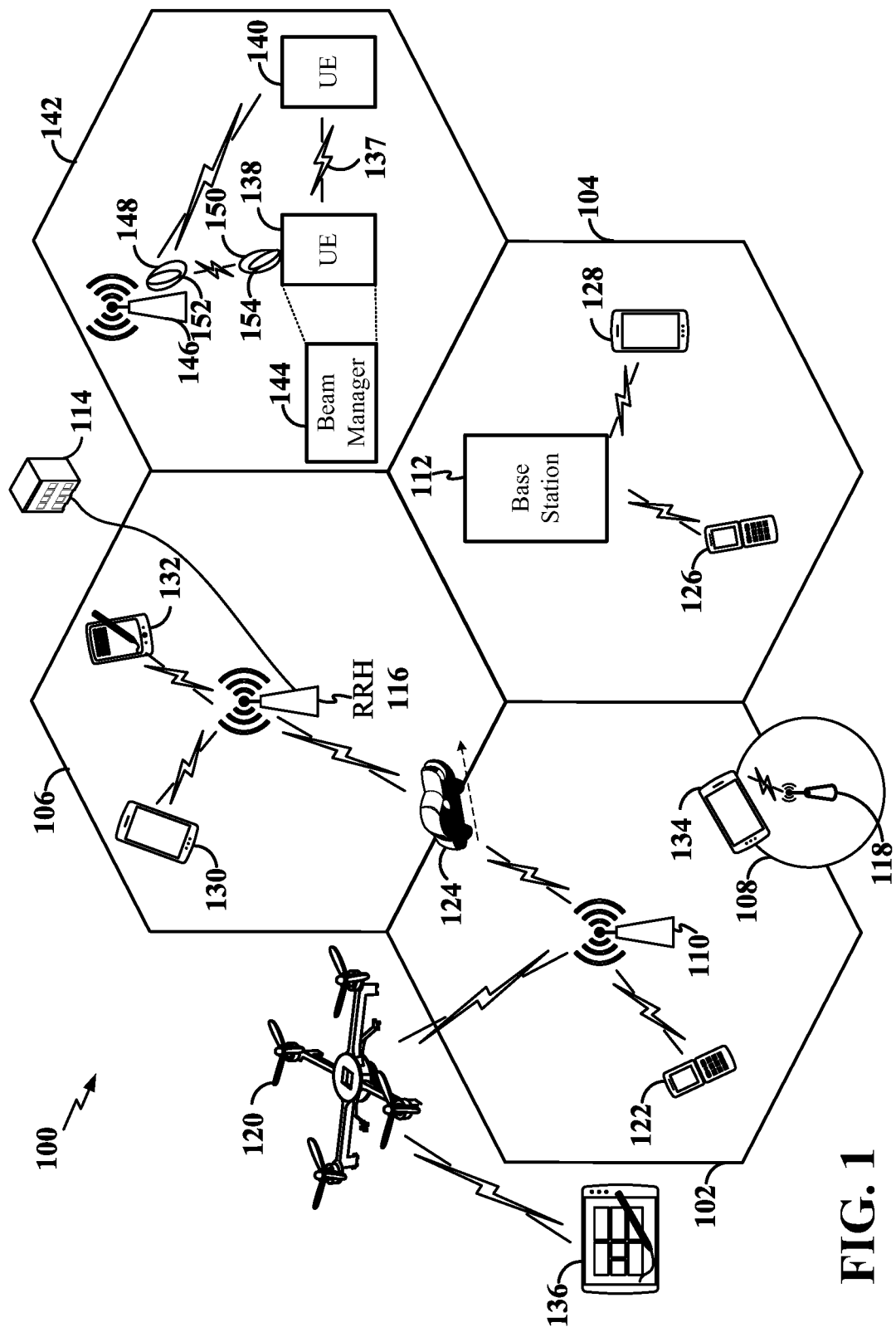
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz -7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and features are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In 5G NR systems, a base station and user equipment (UE) may utilize beamforming to compensate for high path loss and short range. Beamforming is a signal processing technique used with an antenna array for spatially directional signal transmission and/or reception. Each antenna in the antenna array transmits a signal that is combined with other signals of other antennas of the same array in such a way that signals at particular angles experience constructive interference while others experience destructive interference.

The base station and the UE can select one or more beam pair links (BPLs) for communication therebetween on the downlink and/or the uplink. Each BPL includes corresponding transmit and receive beams on the base station and UE. Selection of BPL(s) may occur, for example, during initial acquisition of a cell, during cell reselection, upon detecting a beam failure, or during beam tracking.

Various aspects of the disclosure relate to assisted beam management between frequency bands that each utilize spatially directional beams. A lower frequency band (e.g., FR2) may provide a coarse spatial direction for beams in a higher frequency band (e.g., FR4-a or FR4-1, FR4, FR5, or other higher frequency band). For example, a user equipment (UE) may be configured to receive or scan a plurality of transmit beams on a plurality of receive beams within a first frequency band (e.g., FR2) to select one or more coarse candidate beam pair links (BPLs) in the first frequency band. Each coarse candidate BPL includes one of the transmit beams and one of the receive beams in the first frequency band. The UE may then receive or scan a plurality of narrower transmit beams on a plurality of narrower receive beams within a second frequency band (e.g., FR4-a or FR4-1 or above), each having a spatial direction within the spatial direction of one of the coarse candidate beams of the coarse candidate BPLs, to select one or more narrower BPLs in the second frequency band on which to communicate with a base station.

In some examples, the plurality of transmit beams in the first frequency band may be associated with two or more first transmission and reception points (TRPs) in the network, where each TRP may be associated with a base station. In addition, the plurality of narrower transmit beams in the second frequency band may further be associated with two or more second TRPs. The UE may receive a plurality of synchronization signal blocks (SSBs) on the plurality of transmit beams in the first frequency band. Each SSB may include a collocated indication indicating whether a corresponding one of the first TRPs (e.g., the first TRP that transmitted the SSB) is collocated (e.g., at the same geographical location and coupled to the same antenna tower or pole) with one of the second TRPs. The UE can then select the coarse candidate BPLs associated with SSBs having the collocation indication indicating collocation of first and second TRPs.

In some examples, the UE may include multiple beam managers, each configured to manage beams in one of the frequency bands. For example, a first beam manager may be configured to manage beams in the first frequency band and a second beam manager may be configured to manage beams in the second frequency band. The second beam manager may send an internal request to the first beam manager to scan the plurality of transmit beams in the first frequency band to identify the coarse candidate BPL(s). The second beam manager may then receive an internal report from the first beam manager indicating the coarse candidate BPL(s) and initiate scanning in the second frequency band using the report. In some examples, the first beam manager may be configured to scan the beams in the first frequency band during a time window configured by the base station.

By utilizing FR2 to provide a coarse direction of base station beams and then refining those beams by the narrower beams in FR4-a or FR4-1, FR4, or FR5, more efficient beam acquisition and tracking may be achieved for higher mmWave frequency bands. For example, FR2-assisted beam management for FR4-a or FR4-1 or higher frequency bands may be faster than scanning over all beams in the higher frequency band, resulting in less power consumption and improved mobility of the UE.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, 106, and 142, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, three base stations 110, 112, and 146 are shown in cells 102, 104, and 142, respectively; and a fourth base station 114 is shown controlling a remote radio head (RRH) 116 in cell 106. That is, a base station can have an integrated antenna or can be connected to an antenna or RRH by feeder cables. In the illustrated example, the cells 102, 104, 106, and 142 may be referred to as macrocells, as the base stations 110, 112, 114/116, and 146 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114/116, and 146 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 via RRH 116; UEs 138 and 140 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

In a further aspect of the RAN 100, sidelink signals may be used between UEs without necessarily relying on scheduling or control information from a base station. For example, two or more UEs (e.g., UEs 138 and 140) may communicate with each other using peer to peer (P2P) or sidelink signals 137 without relaying that communication through a base station (e.g., base station 146). In some examples, the sidelink signals 137 include sidelink traffic and sidelink control. In some examples, the UEs 138 and 140 may each function as a scheduling entity or an initiating (e.g., transmitting) sidelink device and/or a scheduled entity or a receiving sidelink device. For example, the UEs 138 and 140 may function as scheduling entities or scheduled entities in a P2P network, a device-to-device (D2D) network, vehicle-to-vehicle (V2V) network, a vehicle-to-everything (V2X), a mesh network, or other suitable network.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, beamformed signals may be utilized between a UE (e.g., UE 138) and a base station (e.g., gNB) 146 communicating, for example, over a mmWave carrier. For example, the UE 138 and base station 146 may communicate over FR2 using spatially directional beams 148 and 150. In some examples, the base station 146 and UE 138 may further be configured for communication on higher frequency bands, including, for example, FR4-a or FR4-1, FR4, and/or FR5. These higher frequency bands may utilize significantly narrower beams 152 and 154 than FR2 to overcome the additional path loss experienced by higher carrier frequencies. As the beams become more narrow in higher frequency bands (e.g., FR4-a or FR4-1 and above), the number of potential beam pair links (BPLs) between the base station 146 and UE 138 grows, and therefore, the task of beam acquisition and beam tracking becomes more complex.

Therefore, in various aspects of the disclosure, the UE 138 may include a beam manager 144 configured to perform FR2-assisted beam management for higher frequency bands (e.g., FR4-a or FR4-1 and above). For example, the beam manager 144 may be configured to scan a plurality of beams within a first frequency band (e.g., FR2) to select one or more coarse candidate beams 148 and 150 in the first frequency band. The beam manager 144 may then scan a plurality of beams within a second frequency band (e.g., FR4-a or FR4-1 or above) having a same spatial direction as the coarse candidate beam(s) 148 to select one or more narrower beams 152 and 154 in the second frequency band on which to communicate with the base station 146. Here, the base station 146 may include collocated transmission and reception points (TRPs) (e.g., TRPs at the same geographical location and coupled to the same antenna tower or pole), each communicating on one of the first frequency band (e.g., FR2) or second frequency band (e.g., FR4-a or FR4-1 or above). In some examples, collocated TRPs may have the same boresight direction.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
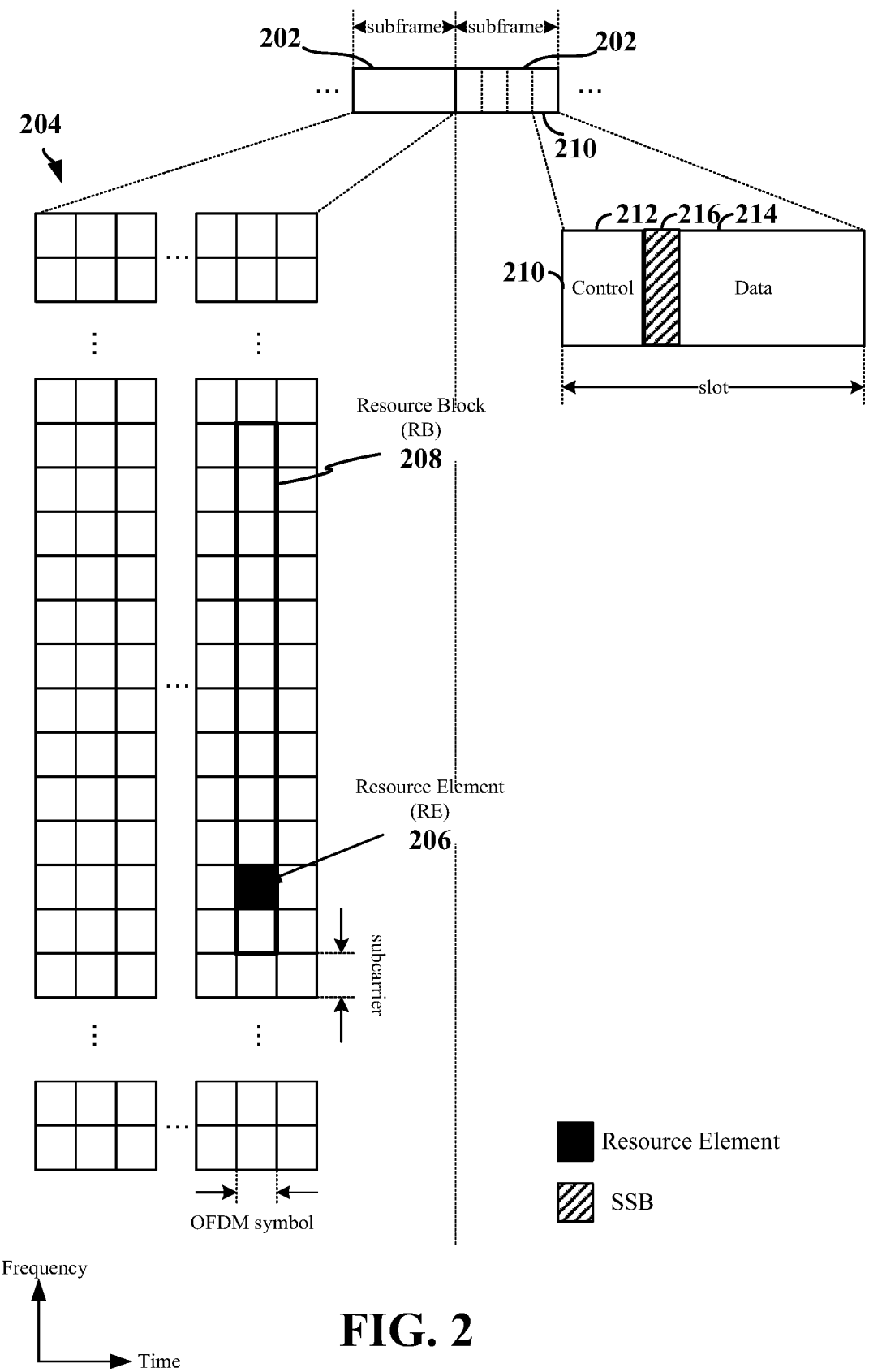
FIG. 2 is a diagram illustrating an example of a frame structure for use in a radio access network according to some aspects.

Referring now to FIG. 2, an expanded view of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

Scheduling of the resources (e.g., REs 206/RBs 208) to transmit control and/or traffic information may be performed in a dynamic manner or a semi-persistent manner. For example, the scheduling entity (e.g., base station) may dynamically allocate a set of REs 206/RBs 208 for the transmission of downlink control and/or data to the UE or for the transmission of uplink control and/or data from the UE. The base station may further semi-persistently allocate a set of REs 206/RBs 208 for periodic downlink or uplink transmissions. Generally, semi-persistent scheduling (SPS) may be used for periodic communications based on defined settings. For example, SPS may be suitable for applications with small, predictable, and/or periodic payloads, such as voice over Internet protocol (VoIP) applications. On the uplink, an SPS resource may be referred to as a configured grant (CG). With CGs, scheduling information corresponding to the uplink CG may be signaled just once to the UE. Subsequently, without needing to receive additional scheduling information, the UE may periodically utilize the resources allocated in the uplink CG. The periodicity with which the UE may transmit user data traffic via the semi-persistently scheduled resources may be established when the CG is initially configured.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels.

In the example shown in FIG. 2, the control region 212 may include downlink control information and the data region 214 may include downlink data channels or uplink data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The synchronization signals PSS and SSS, and in some examples, a physical broadcast control channel (PBCH) and a PBCH DMRS, may be transmitted in a synchronization signal block (SSB), such as SSB 216. SSBs (e.g., SSB 216) may be broadcast at regular intervals based on a periodicity (e.g., 5, 10, 20, 40, 80, or 160 ms). In some examples, SSBs 216 may be utilized with beam sweeping for synchronization purposes. For example, a base station may beam sweep a set of SSBs forming a SSB burst (e.g., a set of SSBs transmitted in a 5 ms window) in a carrier bandwidth. In examples in which the base station includes collocated transmission and reception points (TRPs) (e.g., TRPs at the same geographical location and coupled to the same antenna tower or pole), each communicating in a different frequency band (e.g., FR2 and FR4-a or FR4-1 or above), the beam-swept SSBs (e.g., including SSB 216) in a lower frequency band (e.g., FR2) may each include a collocated indication indicating that there is a collocated TRP in a higher frequency band (e.g., FR4-a or FR4-1 or above). Based on the collocated indication, a UE receiving the beam-swept FR2 SSBs 216 may utilize the FR2 SSBs to assist the UE in selecting narrower beams in the higher frequency band (e.g., FR4-a or FR4-1 or above).

The PBCH in the SSB 216 may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 206 (e.g., within the control region 212, which may be at the end of the slot 210) to carry UL control information (UCI) including one or more UL control channels, such as a physical uplink control channel (PUCCH), to the scheduling entity. UCI may include a variety of packet types and categories. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. The scheduled entity (e.g., UE) may further utilize one or more REs 206 (e.g., within the control region 212 and/or the data region 214) to transmit pilots, reference signals, and other information configured to enable or assist in decoding uplink data transmissions and/or in uplink beam management, such as one or more DMRSs and sounding reference signals (SRSs).

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB and/or a sidelink CSI-RS, may be transmitted within the slot 210.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some examples, spatial division multiplexing may be implemented using a coordinated multi-point (CoMP) network configuration in which transmissions (streams) from multiple transmission and reception points (TRPs) may be simultaneously directed towards a single UE. In a multi-TRP environment providing multi-stream transmission, the multiple TRPs may or may not be collocated (e.g., at the same geographical location and coupled to the same antenna tower or pole). Each of the multiple TRPs may transmit the same or different data to a UE. When transmitting different data from the multiple TRPs, a higher throughput may be achieved. When transmitting the same data (with potentially different redundancy versions) from the multiple TRPs, transmission reliability may be improved. In some examples, each TRP may utilize the same carrier frequency to communicate with a UE. In other examples, each TRP may utilize a different carrier frequency that may be in the same or different frequency bands (e.g., FR2, FR4-a or FR4-1, FR4, FR5, etc.). For example, each TRP may communicate on different carrier frequencies (referred to as component carriers) in the same frequency band or across frequency bands and carrier aggregation may be performed at the UE.

Figure 3:
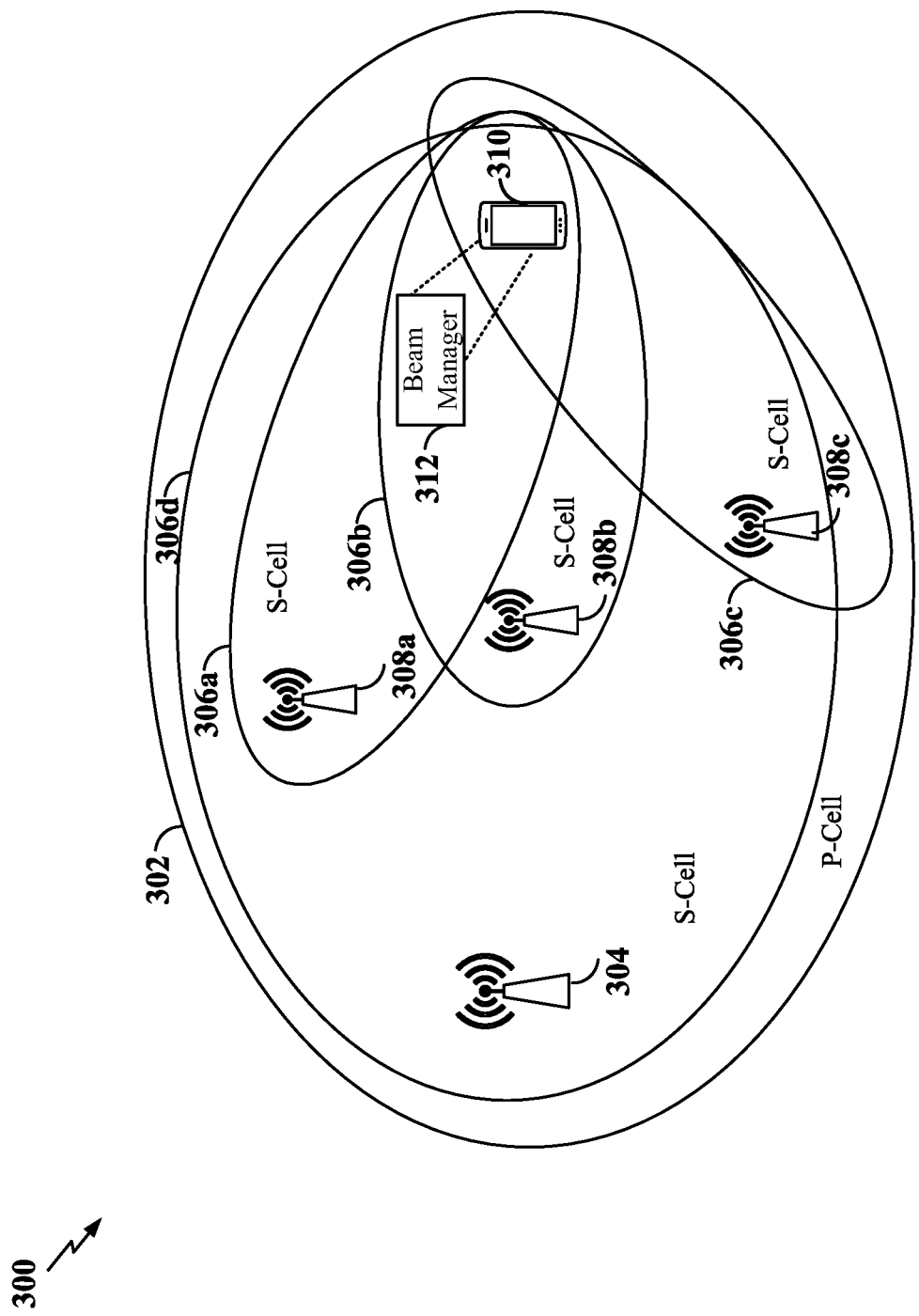
FIG. 3 is a conceptual diagram illustrating an example of a multi-TRP environment according to some aspects.

FIG. 3 is a conceptual diagram illustrating an example of a multi-TRP environment 300 according to some aspects. The multi-TRP environment 300 includes a plurality of cells 302 and 306a-306d. In some examples, one of the cells 302 may be considered a primary serving cell (PCell) 302 and the remaining cells 306a, 306b, 306c, and 306d may be considered secondary serving cells (SCells). The PCell 302 may be referred to as the anchor cell that provides a radio resource control (RRC) connection to the UE. In some examples, the PCell and the SCell may be collocated (e.g., different TRPs at the same geographical location and coupled to the same antenna tower/pole).

When carrier aggregation is configured, one or more of the SCells 306a-306d may be activated or added to the PCell 302 to form the serving cells serving a user equipment (UE) 310. Each serving cell corresponds to a component carrier (CC). The CC of the PCell 302 may be referred to as a primary CC, and the CC of a SCell 306a-306d may be referred to as a secondary CC. The PCell 302 and one or more of the SCells 306 may be served by a respective TRP 304 and 308a-308c similar to any of those illustrated in FIG. 1. In the example shown in FIG. 3, SCells 306a-306c are each served by a respective non-collocated TRP 308a-308c. However, SCell 306d is collocated with the PCell 302. Thus, TRP 304 may include two collocated TRPs, each supporting a different carrier. For example, TRP 304 may correspond to a base station including multiple collocated TRPs. The coverage of the PCell 302 and SCell 306d may differ since different component carriers (which may be in different frequency bands) may experience different path loss.

In some examples, the PCell 302 may add or remove one or more of the SCells 306a-306d to improve reliability of the connection to the UE 310 and/or increase the data rate. The PCell 302 may be changed upon a handover to another PCell.

In some examples, one of the cells (e.g., cell 302) may be a low band cell, and another cell (e.g., cell 306d) may be a high band cell. A low band cell uses a carrier frequency in a frequency band lower than that of the high band cells. For example, the high band cell may use a high band mmWave carrier (e.g., FR4-a or FR4-1 or above), and the low band cell may use a low band mmWave carrier (e.g., FR2). In this example, carrier aggregation may not be performed between the cells 302 and 306d, depending on whether carrier aggregation across frequency bands is supported. In addition, when using mmWave carriers (FR2 or above), beamforming may be used to transmit and receive signals.

In examples in which the cell 302 communicates over FR2 and the collocated cell 306d communicates over a higher frequency band (e.g., FR4-a or FR4-1 or above), the UE 310 may include a beam manager 312 configured to perform FR2-assisted beam management for the cell 306d. For example, the beam manager 312 may be configured to scan a plurality of FR2 beams (e.g., SSB beams) within the cell 302 to select one or more coarse candidate FR2 beams. The beam manager 312 may then scan a plurality of beams within the cell 306d having a same spatial direction as the coarse candidate FR2 beam(s) to select one or more narrower beams (FR4-a or FR4-1 or above beams) in the cell 306d on which to communicate with the base station 304.

Figure 4:
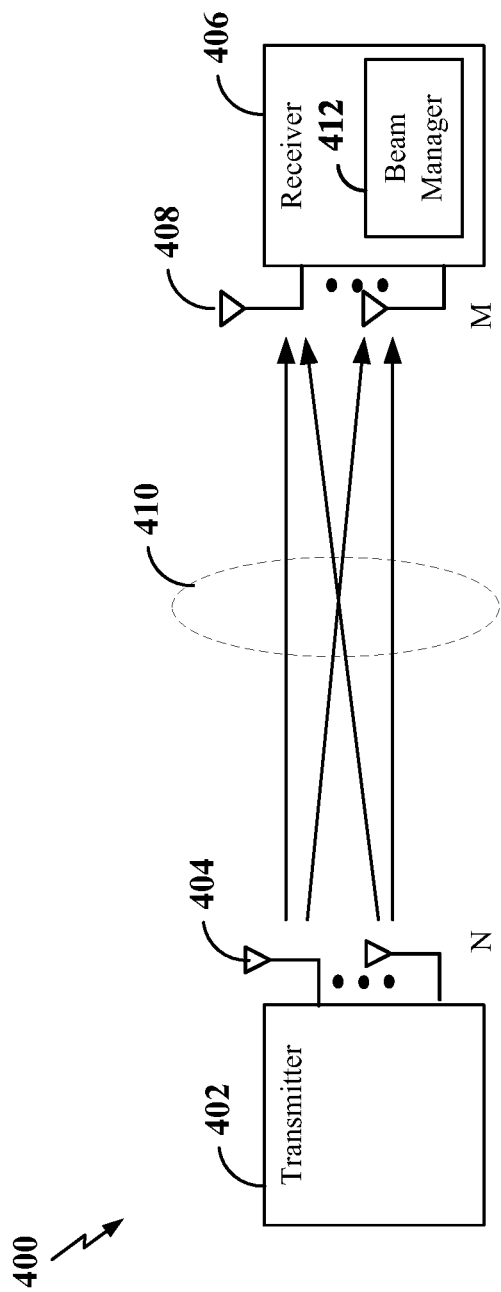
FIG. 4 is a block diagram illustrating a wireless communication system supporting beamforming and/or multiple-input multiple-output (MIMO) communication according to some aspects.

FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

To facilitate communication of signals using transmit beams and receive beams in a lower mmWave frequency band (e.g., FR2) and a higher mmWave frequency band (e.g., FR4-a or FR4-1 or above), at least one of the transmitter 402 and receiver 406 (e.g., the receiver 406, as shown in FIG. 4) may include a beam manager 412 configured to perform FR2-assisted beam management for the higher mmWave frequency band. Here, the receiver 406 may correspond to a UE or other scheduled entity and the transmitter 402 may correspond to a base station or other scheduling entity having collocated TRPs, each communicating on one of the lower mmWave frequency band and the higher mmWave frequency band. For example, the beam manager 412 may be configured to scan a plurality of beams within the lower mmWave frequency band (e.g., FR2) to select one or more coarse candidate beams in the lower mmWave frequency band. The beam manager 412 may then scan a plurality of beams within the higher mmWave frequency band (e.g., FR4-a or FR4-1 or above) having a same spatial direction as the coarse candidate beam(s) to select one or more narrower beams in the higher mmWave frequency band on which to communicate with the transmitter 402.

Figure 5:
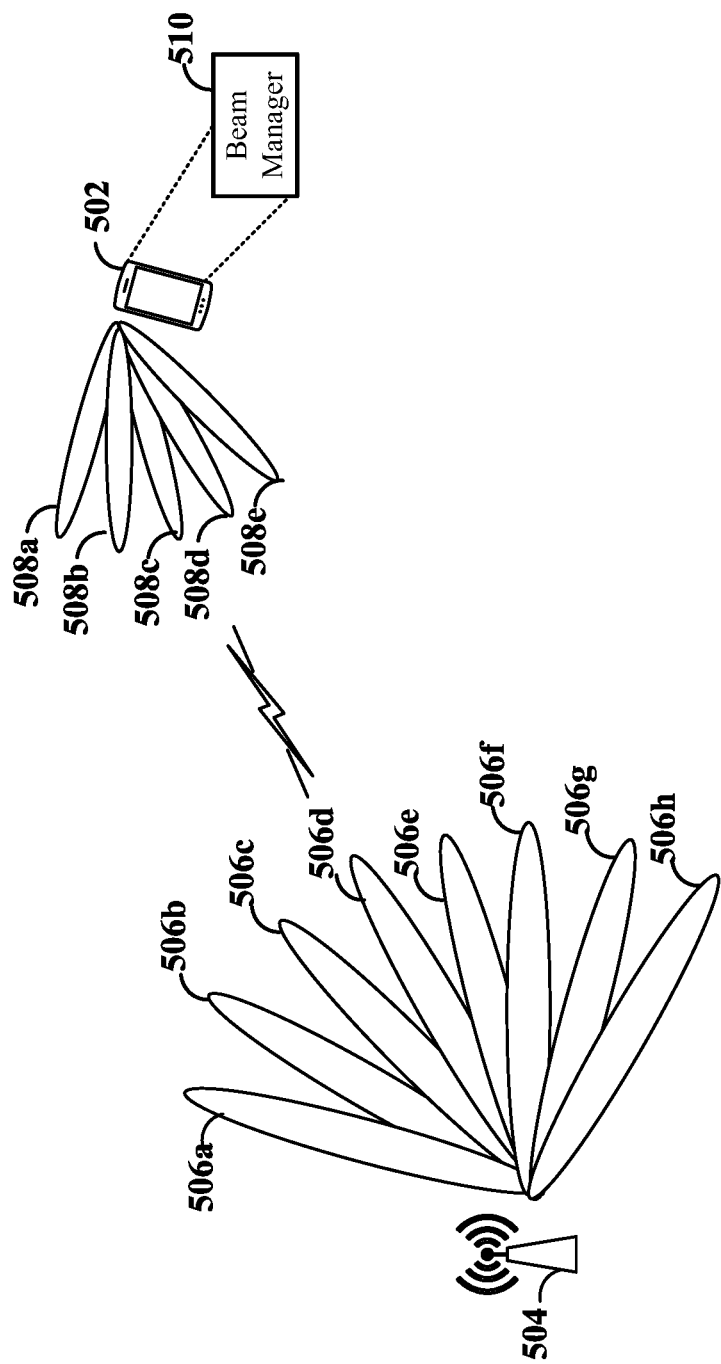
FIG. 5 is a diagram illustrating an example of communication between a base station and a UE using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 3, and the UE 502 may be any of the UEs or scheduled entities illustrated in FIGS. 1 and/or 3.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams 506a-506h, each associated with a different spatial direction. In addition, the UE 502 is configured to generate a plurality of receive beams 508a-508e, each associated with a different spatial direction. It should be noted that while some beams are illustrated as adjacent to one another, such an arrangement may be different in different aspects. For example, transmit beams 506a-506h transmitted during a same symbol may not be adjacent to one another. In some examples, the base station 504 and UE 502 may each transmit more or less beams distributed in all directions (e.g., 360 degrees) and in three-dimensions. In addition, the transmit beams 506a-506h may include beams of varying beam width. For example, the base station 504 may transmit certain signals (e.g., SSBs) on wider beams and other signals (e.g., CSI-RSs) on narrower beams.

The base station 504 and UE 502 may select one or more transmit beams 506a-506h on the base station 504 and one or more receive beams 508a-508e on the UE 502 for communication of uplink and downlink signals therebetween using a beam management procedure. In one example, during initial cell acquisition, the UE 502 may perform a P1 beam management procedure to scan the plurality of transmit beams 506a-506h on the plurality of receive beams 508a-508e to select a beam pair link (e.g., one of the transmit beams 506a-506h and one of the receive beams 508a-508e) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 504 and UE 502 may perform a P2 beam management procedure for beam refinement at the base station 504. For example, the base station 504 may be configured to sweep or transmit a CSI-RS on each of a plurality of narrower transmit beams 506a-506h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506a-506h on the plurality of receive beams 508a-508e. The UE 502 then performs beam measurements (e.g., RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 506a-506h on one or more of the receive beams 508a-508e to the base station 504. The base station 504 may then select one or more CSI-RS transmit beams on which to communicate downlink and/or uplink control and/or data with the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective beam pair link (BPL) for each selected serving CSI-RS transmit beam. For example, the UE 502 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 504 may configure the UE 502 to perform SSB beam measurements and provide an L1 measurement report containing beam measurements of SSB transmit beams 506a-506h. For example, the base station 504 may configure the UE 502 to perform SSB beam measurements and/or CSI-RS beam measurements for beam failure detection (BRD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508a-508e. For example, the UE 502 may transmit an SRS on each beam in the different beam directions. In addition, the base station 504 may be configured to receive the uplink beam reference signals on a plurality of transmit beams 506a-506h. The base station 504 then performs beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to communicate downlink and/or uplink control and/or data with the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 506d) on the base station 504 and a single receive beam (e.g., beam 508c) on the UE may form a single BPL used for communication between the base station 504 and the UE 502. In another example, multiple CSI-RS transmit beams (e.g., beams 506c, 506d, and 506e) on the base station 504 and a single receive beam (e.g., beam 508c) on the UE 502 may form respective BPLs used for communication between the base station 504 and the UE 502. In another example, multiple CSI-RS transmit beams (e.g., beams 506c, 506d, and 506e) on the base station 504 and multiple receive beams (e.g., beams 508c and 508d) on the UE 502 may form multiple BPLs used for communication between the base station 504 and the UE 502. In this example, a first BPL may include transmit beam 506c and receive beam 508c, a second BPL may include transmit beam 508d and receive beam 508c, and a third BPL may include transmit beam 508e and receive beam 508d.

In some examples, the transmit beams 506a-506h on the base station 504 and the receive beams 508a-508e on the UE 502 may be spatially directional FR2 beams. In some examples, the base station 504 and UE 502 may further be configured for communication on higher frequency bands, including, for example, FR4-a or FR4-1, FR4, and/or FR5. For example, the base station 504 may include collocated TRPs, each communicating on one of a first frequency band (e.g., FR2) or a second frequency band (e.g., FR4-a or FR4-1 or above). These higher mmWave bands may utilize significantly narrower beams than FR2 to overcome the additional path loss experienced by higher carrier frequencies. As the beams become more narrow in higher mmWave frequency bands (e.g., FR4-a or FR4-1 and above), the number of potential beam pair links (BPLs) between the base station 504 and UE 502 grows, and therefore, the task of beam acquisition and beam tracking becomes more complex. For example, the beam width may linearly vary with frequency, and as such, between 40 GHz in FR2 and 140 GHz in FR5, there may be a factor of four more beams in FR5 as opposed to FR2 (or a factor of sixteen more beams in three-dimensional space). Utilizing wider beams in higher mmWave bands for beam acquisition and beam tracking is unlikely, since the wider beams may limit coverage in the higher mmWave frequency bands.

Therefore, in various aspects of the disclosure, the UE 502 may include a beam manager 510 configured to perform FR2-assisted beam management (e.g., beam acquisition and beam tracking) for higher mmWave bands (e.g., FR4-a or FR4-1 and above). For example, the beam manager 510 may be configured to scan the plurality of transmit beams 506a-506h on the plurality of receive beams 508a-508a within a first frequency band (e.g., FR2) and select one or more coarse candidate beams in FR2. In an example, the beam manager 510 may select transmit beam 506d and receive beam 508c. The beam manager 510 may then scan a plurality of narrower transmit beams (not shown) within a second frequency band (e.g., FR4-a or FR4-1 or above) on a plurality of narrower receive beams (not shown) within the second frequency band. Here, the plurality of narrower transmit beams scanned in the second frequency band are within a spatial direction (referred to herein as a downlink spatial direction) of the selected FR2 transmit beam 506d and the plurality of narrower receive beams in the second frequency band are within a spatial direction (referred to herein as an uplink spatial direction) of the selected FR2 receive beam 508c. The beam manager 510 may then select a BPL in the second frequency band from the scanned narrower transmit beams and scanned narrower receive beams in the second frequency band on which to communicate with the base station 504.

By utilizing FR2 to provide a coarse direction of gNB beams and then refining those beams by the narrower beams in FR4-a or FR4-1, FR4, or FR5, more efficient beam acquisition and tracking may be achieved for higher mmWave frequency bands. For example, FR2-assisted beam management for FR4-a or FR4-1 or higher frequency bands may be faster than scanning over all beams in the higher frequency band, resulting in less power consumption and improved mobility of the UE 502.

Figure 6A:
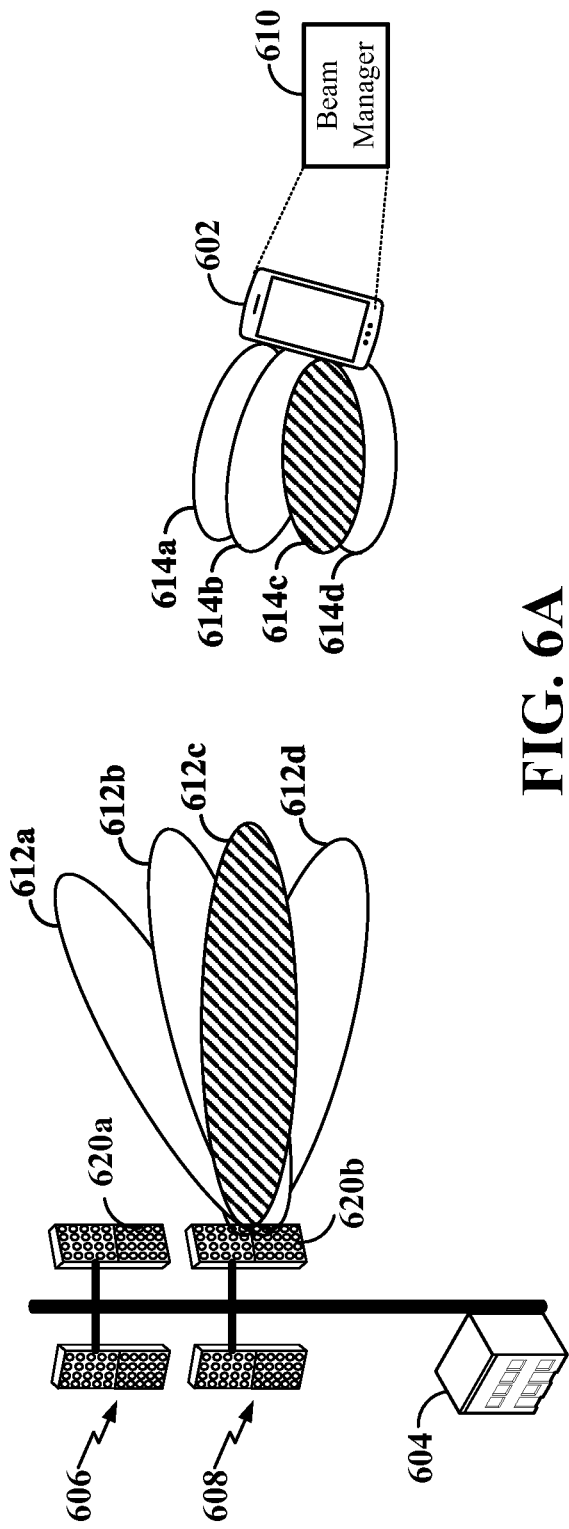
FIGS. 6A-6C are diagrams illustrating an example of assisted beam management between frequency bands according to some aspects.
Figure 6B:
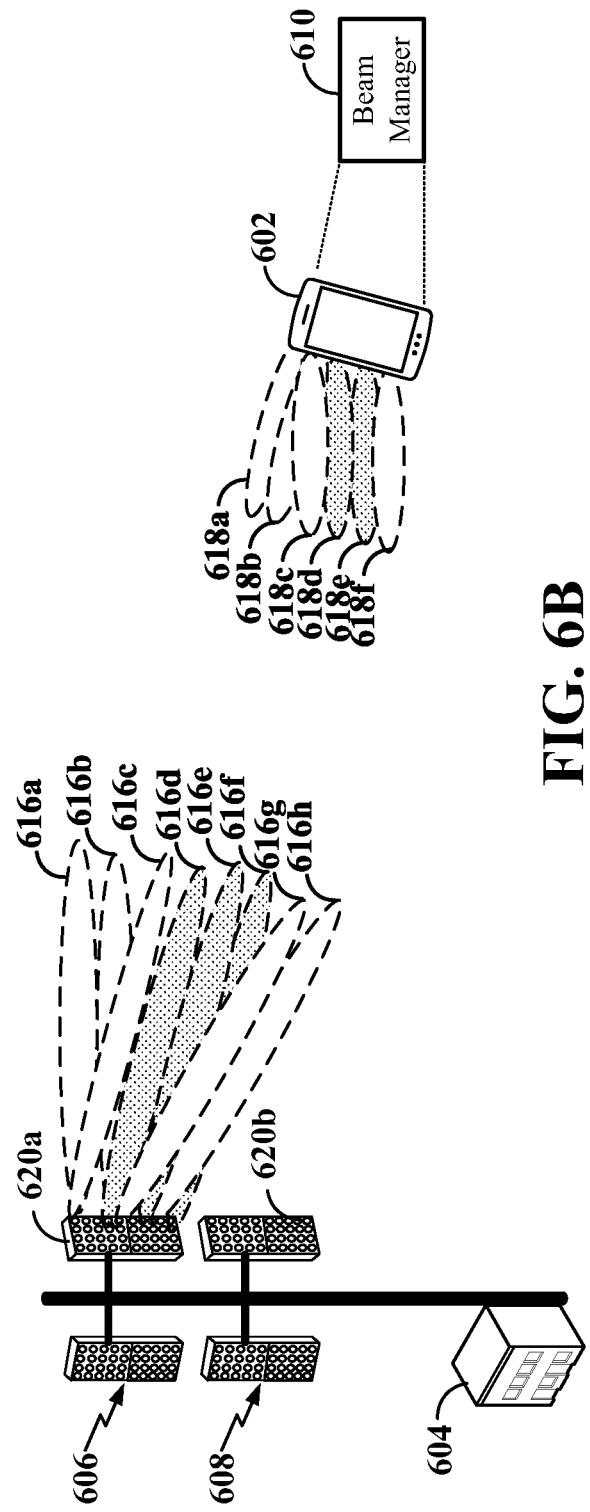
Figure 6C:
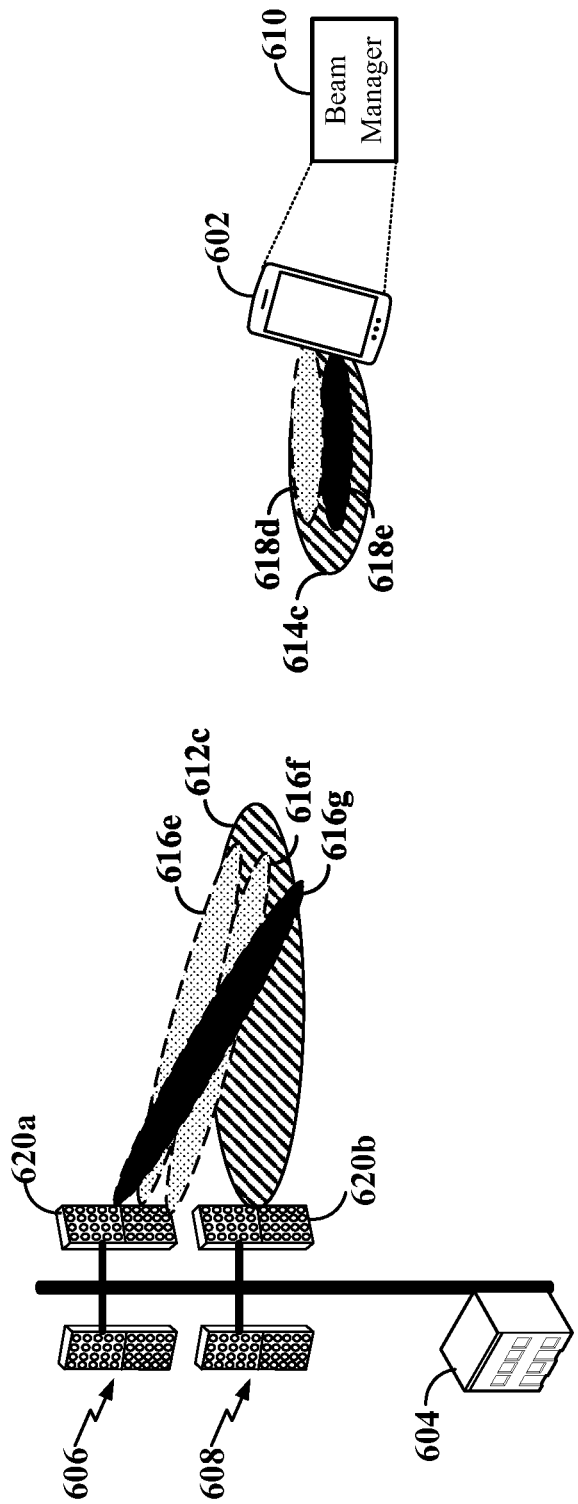

FIGS. 6A-6C are diagrams illustrating an example of assisted beam management between frequency bands (e.g., between FR2 and FRX, where FRX is FR4-a or FR4-1, FR4, FR5, or other mmWave or higher frequency range (FR) designation) according to some aspects. In the example shown in FIG. 6A, a base station 604 is in communication with a UE 602 over multiple frequency bands (e.g., FR2 and FRX). The base station 604 may be any of the base stations (e.g., gNBs) or scheduling entities illustrated in FIGS. 1, 3, and/or 5, and the UE 602 may be any of the UEs or scheduled entities illustrated in FIGS. 1, 3 and/or 5.

The base station 604 may include, for example, a first TRP 606 configured for communication over a first frequency band (e.g., FR2) and a second TRP 608 configured for communication over a second frequency band higher than the first frequency band (e.g., FRX). As shown in the example of FIGS. 6A-6C, the TRPs 606 and 608 are collocated on the same cell tower. Each TRP 606 and 608 includes a plurality of antenna arrays 620a and 620b, respectively, (two of which for each TRP 606 and 608 are shown for simplicity) for beamforming in all directions (e.g., 360 degrees) and in three-dimensions. The UE 602 is further configured to communicate on both the first frequency band and the second frequency band. In some examples, the first frequency band is FR2 and the second frequency band is FRX (e.g., FR4-a or FR4-1, FR4, FR5, or other higher frequency band). In other examples, the first frequency band may be FR4-a or FR4-1 or other lower mmWave frequency band and FRX may be a higher mmWave frequency band.

For example, as shown in FIG. 6A, the first TRP 606 may be configured to generate a plurality of first transmit beams 612a-612d (four of which are shown for simplicity), each associated with a different respective first downlink spatial direction. In addition, the UE 602 may be configured to generate a plurality of first receive beams 614a-614d (four of which are shown for simplicity), each associated with a different respective first uplink spatial direction. In addition, as shown in FIG. 6B, the second TRP 608 may be configured to generate a plurality of second transmit beams 616a-616h (eight of which are shown for simplicity), each associated with a different respective second downlink spatial direction. In addition, the UE 602 may be configured to generate a plurality of second receive beams 618a-618f (six of which are shown for simplicity), each associated with a different respective second uplink spatial direction.

Since the first transmit beams 612a-612d (e.g., FR2 beams) have a respective beam width that is wider than the respective beam widths of second transmit beams 616a-616f (e.g., FRX beams), each of the second transmit beams 616a-616h has a respective second downlink spatial direction that is within at least one of the respective first downlink spatial directions of the first transmit beams 612a-612d. In addition, since each of the first receive beams 614a-614d has a respective beam width that is wider than the respective beam widths of the second receive beams 618a-618f, each of the second receive beams 618a-618f has a respective second uplink spatial direction that is within at least one of the respective first uplink spatial directions of the first receive beams 614a-614d. Therefore, each of the first transmit beams 612a-612d may provide a coarse spatial direction for one or more of the second transmit beams 616a-616f. In addition, each of the first receive beams 614a-614d may provide a coarse spatial direction for one or more of the second receive beams 618a-618f.

To facilitate beam pair selection on FRX with assistance from FR2, the UE 602 may include a beam manager 610 configured to scan the plurality of first transmit beams 612a-612d on the plurality of first receive beams 614a-614d. In some examples, the first transmit beams 612a-612d are SSB transmit beams (e.g., each carrying a respective SSB) such that the UE 602 may receive a plurality of SSBs on the plurality of first transmit beams 612a-612d. The beam manager 610 may then identify at least one candidate first beam pair link (BPL) in FR2 based on the scan. Each candidate first BPL includes one of the first transmit beams and one of the first receive beams. For example, the beam manager 610 may measure a respective received power (e.g., RSRP) of each of the plurality of first transmit beams 612a-612d on each of the plurality of first receive beams 614a-614d and select the at least one candidate first BPL based on the measured received power. The selected candidate first BPL(s) may have a higher received power than other first BPLs (e.g., the selected first transmit beam(s) may have the highest RSRP on the corresponding selected first receive beam(s)). The selected candidate first BPL(s) further include beams that are not blocked or otherwise degraded due to an obstruction. In the example shown in FIG. 6A, the selected candidate first BPL includes first transmit beam 612c and first receive beam 614c.

The beam manager 610 in the UE 602 can then further refine the FRX beams in the same coarse spatial direction as the selected candidate first BPL (e.g., the first BPL including the first transmit beam 612c and first receive beam 614c). In the example shown in FIGS. 6B and 6C, the beam manager 610 may identify a subset of the second transmit beams (e.g., second transmit beams 616e-616g) that have a respective second downlink spatial direction within the first downlink spatial direction of the selected first transmit beam 612c. In addition, the beam manager 610 may identify a subset of the second receive beams (e.g., receive beams 618d and 618e) that have a respective second uplink spatial direction within the first uplink spatial direction of the selected first receive beam 614c. In some examples, the spatial direction mapping between FR2 beams and FRX beams may be pre-configured on the base station 604 and UE 602.

As further shown in FIG. 6C, the beam manager 610 may then be configured to scan the subset of the second transmit beams 616e-616g on the subset of the receive beams 618d and 618e to select a second BPL including one of the second transmit beams 616e-616g and one of the receive beams 618d or 618e for communication with the base station 604 over FRX. For example, the UE 602 may receive a respective beam reference signal (e.g., SSB, CSI-RS, or other suitable reference signal) on each of the subset of second transmit beams 616e-616g and measure the received power (e.g., RSRP) or other beam quality measurement (e.g., SINR, RSRQ, etc.) of each of the second transmit beams 616e-616g on each of the second receive beams 618d and 618e. The beam manager 610 may then select the second BPL based on the measured beam quality. The selected second BPL may have a higher quality (e.g., a higher received power) than other second BPLs (e.g., the selected second transmit beam may have the highest RSRP as measured on the selected second receive beam). The selected second BPL further includes beams that are not blocked or otherwise degraded due to an obstruction. In the example shown in FIG. 6C, the selected second BPL includes second transmit beam 616g and second receive beam 618e.

Figure 7:
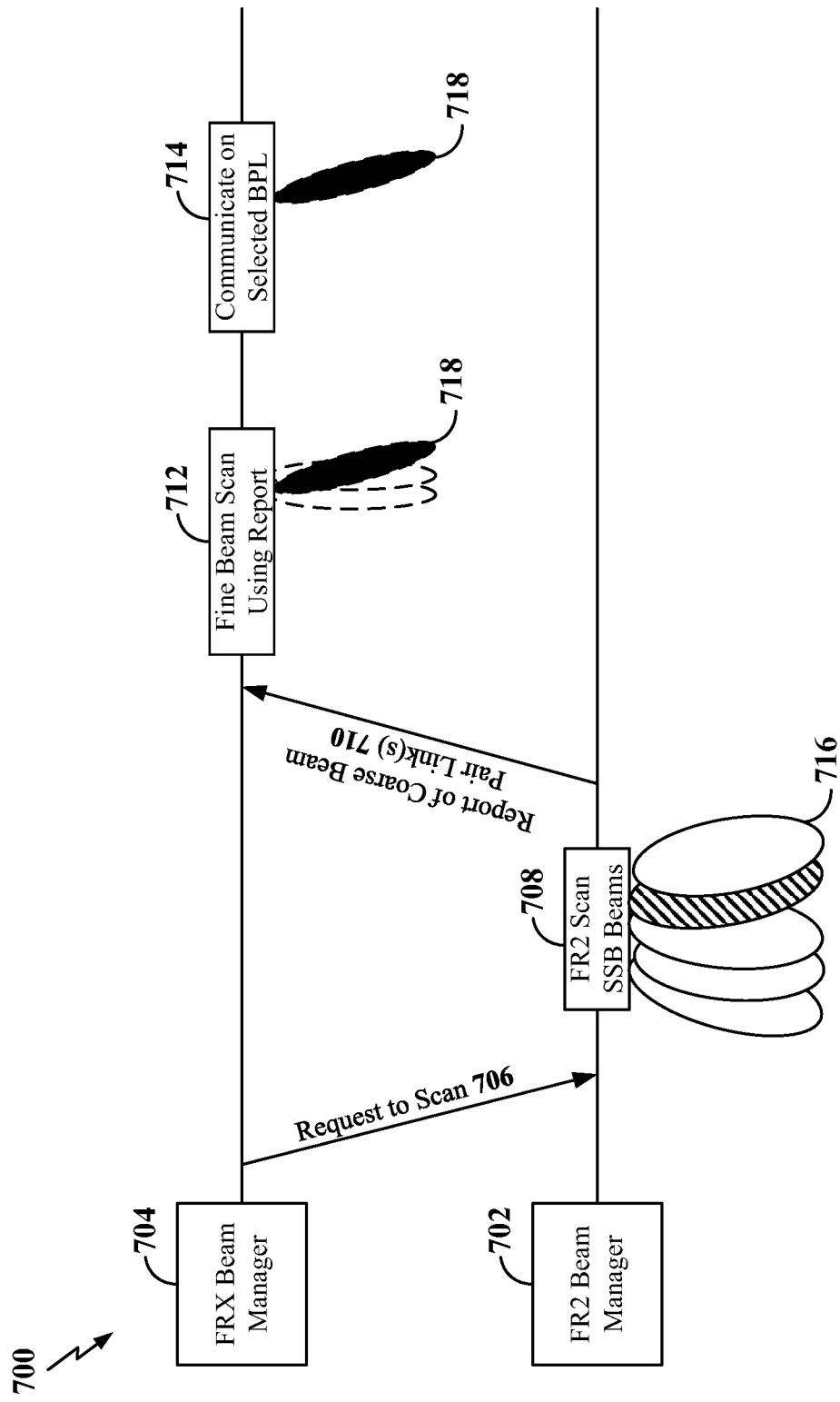
FIG. 7 is a diagram illustrating an example of communication between beam managers of different frequency bands within a UE for assisted beam management according to some aspects.

FIG. 7 is a diagram illustrating an example of communication between beam managers of different frequency bands within a UE 700 for assisted beam management according to some aspects. In the example shown in FIG. 7, the UE 700 includes an FR2 beam manager 702 configured for beam management in FR2 and an FRX beam manager 704 configured for beam management in FRX (e.g., FR4-a or FR4-1, FR4, FR5, or other frequency band higher than FR2). In some examples, each beam manager 702 and 704 may be configured to manage a respective set of antenna arrays on the UE 700, where each set of antenna arrays is configured for FR2 or FRX communication.

To initiate an FRX beam selection, at 706, the FRX beam manager 704 may send a request to the FR2 beam manager 702 to scan a plurality of FR2 beams to obtain one or more candidate coarse BPLs in FR2. In some examples, the FRX beam manager 704 may send the request to the FR2 beam manager 702 during initial cell acquisition for FRX, during cell reselection, upon beam failure detection (BFD), or upon receiving a request from a base station to perform beam measurements (e.g., via a radio resource control (RRC) message, medium access control-control element (MAC-CE), or downlink control information (DCI)). In some examples, the UE 700 may not have an active session in FR2 at the time the FRX beam manager 704 sends the request to the FR2 beam manager 702. In this example, the FR2 beam manager 702 may turn on (e.g., power on) to perform the FR2 scan and then return to an idle state (e.g., power off).

At 708, the FR2 beam manager 702 may scan a plurality of FR2 SSB transmit beams from one or more neighboring base stations (e.g., one or more FR2 TRPs of one or more base stations) on a plurality of FR2 receive beams 716. The FR2 beam manager 702 may then select one or more candidate coarse BPLs in FR2 (e.g., by maximal RSRP). The selected candidate coarse BPLs are associated with FR2 TRPs collocated with FRX TRPs. In some examples, the PBCH in each of the received SSBs may include a collocation indication (e.g., an extra bit) indicating whether FRX is collocated with FR2. In other examples, the FR2 beam manager 702 may receive a respective RRC message from each of the one or more neighboring base stations indicating whether each FR2 TRP is collocated with an FRX TRP.

At 710, the FR2 beam manager 702 may send a report to the FRX beam manager 704 indicating the selected candidate coarse BPLs. At 712, the FRX beam manager 704 may perform a fine beam scan using the report. For example, the FRX beam manager 704 may scan a plurality of narrower FRX transmit beams from one or more neighboring base stations (e.g., one or more FRX TRPs of one or more base stations) on a plurality of FRX receive beams 718. The FRX beam manager 704 may then select one or more fine BPLs in FRX (e.g., by maximal RSRP). At 714, the FRX beam manager 704 may then enable communication on the selected fine BPL(s) in FRX.

Figure 8:
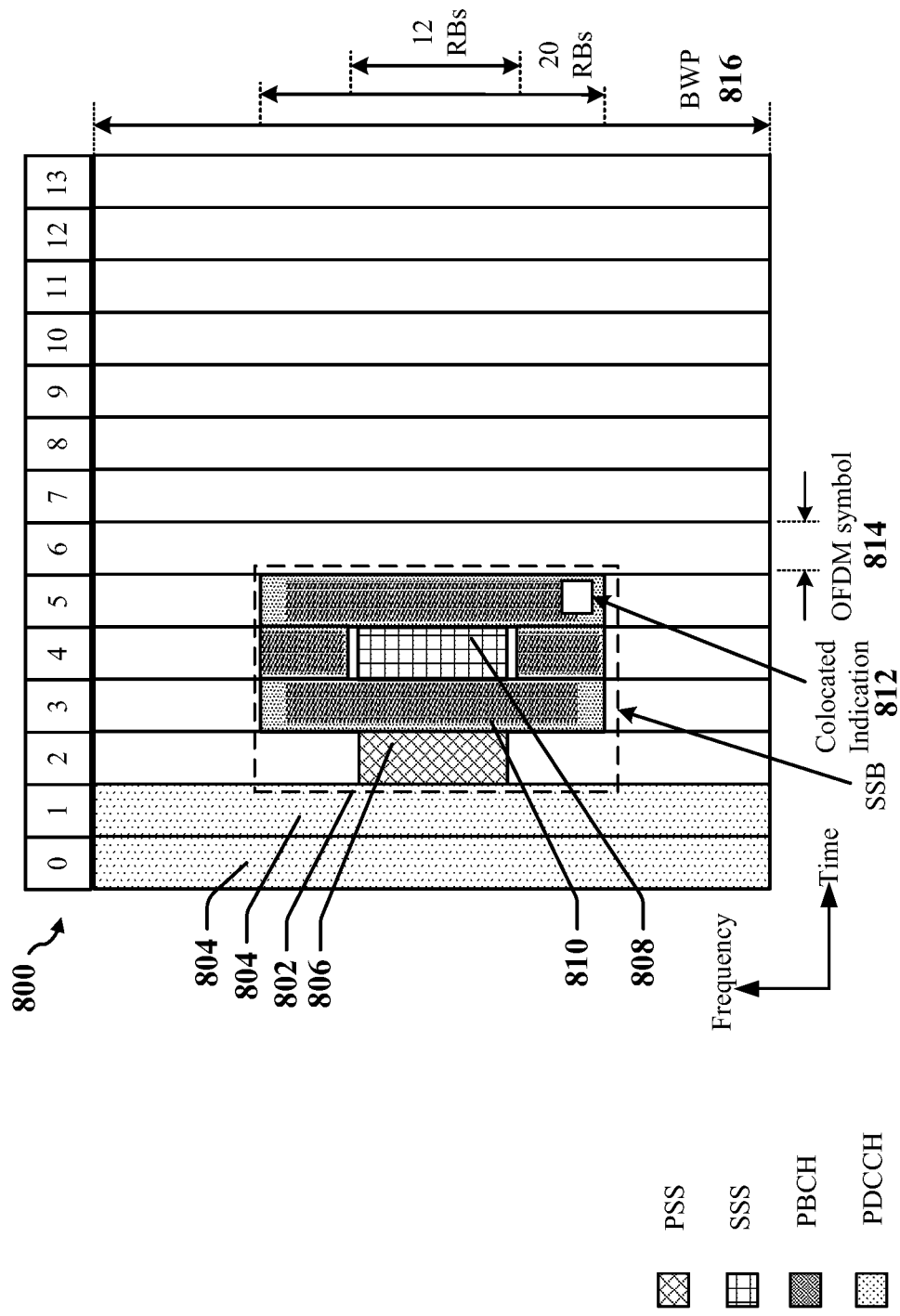
FIG. 8 is a diagram illustrating an example of a synchronization signal block (SSB) according to some aspects.

FIG. 8 is a diagram illustrating an example of a synchronization signal block (SSB) 802 according to some aspects. The SSB 802 is shown transmitted within a slot 800 including a plurality of symbols 814 (e.g., OFDM symbols). In some examples, a PDCCH 804 may be transmitted within the first two symbols 814 of the slot 800. The SSB 802 may then be transmitted over the next four symbols 814 in the time domain and over 20 RBs in the frequency domain. The SSB 802 includes the PSS 806, the SSS 808, and the PBCH 810. In this example, the PSS 806 may occupy 127 subcarriers of a bandwidth part (BWP) 816 within symbol 2 and the PBCH 810 may occupy 20 RBs of the BWP 816 in symbols 3 and 5. Symbol 4 may include the SSS 808, which may occupy 127 subcarriers between two portions of the PBCH 810, with each PBCH portion spanning 4 RBs.

In some examples, the BWP 816 is in FR2, and as such, the SSB 802 may be included in an SSB block containing a plurality of SSBs beam-swept over a plurality of FR2 transmit beams. In this example, the PBCH 810 of each SSB may further include a collocation indication 812 indicating whether FR2 is collocated with FRX for assisted beam management of FRX. For example, the collocation indication 812 may include a single bit added to the PBCH 810.

Figure 9A:
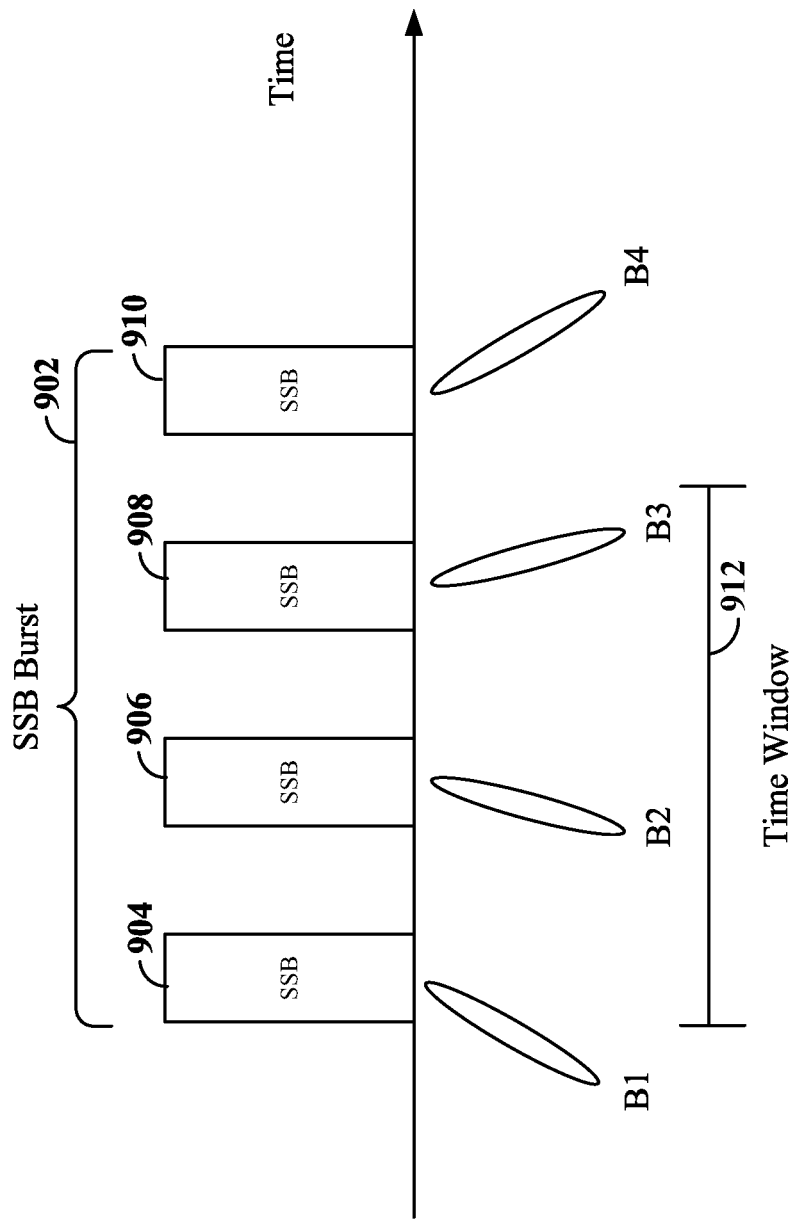
FIGS. 9A and 9B are diagrams illustrating exemplary SSB transmissions according to some aspects.
Figure 9B:
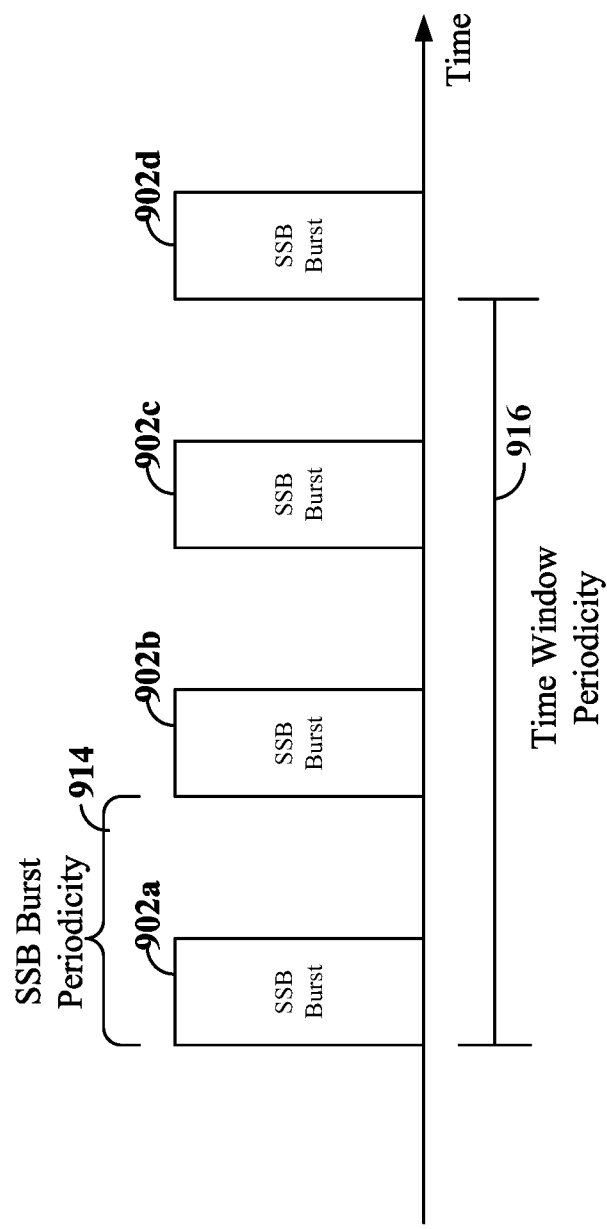

FIGS. 9A and 9B are diagrams illustrating exemplary SSB transmissions according to some aspects. As shown in the example of FIG. 9A, a base station can broadcast multiple SSBs 904, 906, 908, and 910 within an SSB burst 902 using different beams (e.g., B1, B2, B3, and B4) or beam directions. Four exemplary SSBs are illustrated in FIG. 9A. However, the number of SSBs in a single SSB burst 902 may be frequency dependent. For example, in FR2, there may be 64 SSBs per SSB burst 902, and the duration of an SSB burst 902 may be, for example, up to 5 ms.

Each SSB beam can be identified by a unique SSB index (SSB resource indicator (SSBRI)) or beam index. A UE can measure the received power (e.g., RSRP) of each SSB beam, for example, by measuring a DMRS included in the PBCH of the SSB. From the measurements, the UE can identify the SSB beam(s) having the highest RSRP as the coarse candidate FR2 beams for FRX beam refinement.

In some examples, the UE may be configured with a time window 912 within which to obtain the coarse candidate FR2 beams for FRX beam refinement. The time window 912 may include all or a part of an SSB burst 902, the latter being illustrated in FIG. 9A. In the example shown in FIG. 9A, the time window 912 includes three SSBs 904, 906, and 908 of the SSB burst 902. However, the time window 912 is not limited to any particular number of SSBs or any particular starting SSB or ending SSB within an SSB burst 902. The time window 912 may allow the UE to receive data, process CSI-RS, or otherwise communicate with the base station during the remainder of the SSB burst 902.

In addition, as shown in FIGS. 9A and 9B, the time window 912 may have a periodicity 916 that is a multiple of an SSB burst periodicity 914. For example, the SSB burst periodicity 914 of SSB bursts 902a-902d may be 20 ms. In the example shown in FIG. 9B, the time window periodicity 916 may be 60 ms, corresponding to three times the SSB burst periodicity 914. Thus, for example, the UE may be configured with a time window 912 within SSB burst 902a and SSB burst 902d for FR2-assisted beam management. In some examples, the UE may be configured with the time window 912 and time window periodicity 916 via an RRC message transmitted from the base station to the UE.

Figure 10:
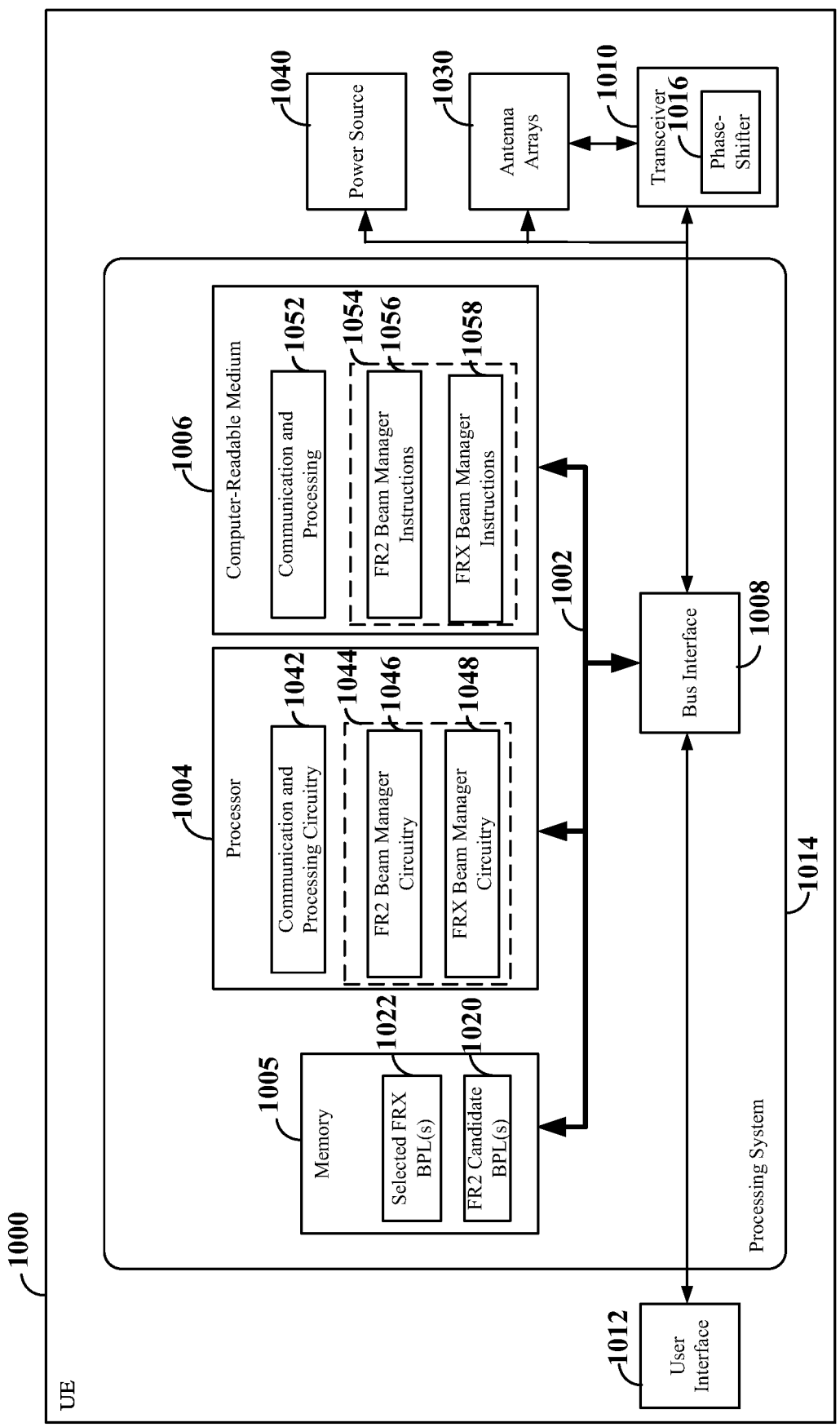
FIG. 10 is a block diagram illustrating an example of a hardware implementation for a UE employing a processing system according to some aspects.

FIG. 10 is a conceptual diagram illustrating an example of a hardware implementation for an exemplary UE 1000 employing a processing system 1014. For example, the UE 1000 may be any of the UEs or scheduled entities illustrated in any one or more of FIGS. 1, 2, and/or 4-6.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes described below in connection with FIG. 10.

The processor 1004 may in some instances be implemented via a baseband or modem chip and in other implementations, the processor 1004 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). In some examples, the transceiver 1010 may include a phase-shifter 1016 for digital and/or analog beamforming via one or more antenna array(s) 1030. A user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with a base station, such as a gNB, TRP, or other scheduling entity. In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1042 may be configured to receive and process downlink beamformed signals at a mmWave frequency (e.g., FR2, FR4-a or FR4-1, FR4, FR5, etc.) via the transceiver 1010 and the antenna array 1030 (e.g., using the phase-shifter 1016). In addition, the communication and processing circuitry 1042 may be configured to generate and transmit uplink beamformed signals at a mmWave frequency via the transceiver 1010 and antenna array 1030 (e.g., using the phase-shifter 1016).

The communication and processing circuitry 1042 may further be configured to receive a plurality of SSBs on a plurality of first transmit beams in a first frequency band (e.g., FR2) from one or more TRPs. In some examples, each of the received SSBs may include a respective collocation indication indicating whether the TRP that transmitted the SSB beam is collocated with a TRP in a second frequency band (e.g., FRX, such as FR4-a or FR4-1, FR4, or FR5). In other examples, the communication and processing circuitry 1042 may be configured to receive a respective collocation indication from each of the FR2 TRPs via RRC messages.

The communication and processing circuitry 1042 may further be configured to receive a plurality of reference signals (e.g., SSB, CSI-RS, etc.) on a plurality of second transmit beams in the second frequency band. In some examples, a respective beam width of the plurality of first transmit beams is wider than a respective beam width of the plurality of second transmit beams.

The communication and processing circuitry 1042 may further be configured to receive an RRC message from a base station including a time window and time window periodicity for performing FR2-assisted beam management for FRX. The communication and processing circuitry 1042 may further be configured to execute communication and processing software 1052 stored in the computer-readable medium 1006 to implement one or more of the functions described herein.

The processor 1004 may further include beam manager circuitry 1044, configured to perform beam management in multiple frequency bands (e.g., FR2 and FRX). For example, the beam manager circuitry 1044 may include FR2 beam manager circuitry 1046 and FRX beam manager circuitry 1048. The FR2 beam manager circuitry 1046 may correspond, for example, to the FR2 beam manager 702 shown in FIG. 7 and the FRX beam manager circuitry 1048 may correspond, for example, to the FRX beam manager 704 shown in FIG. 7. In some examples, the beam manager circuitry 1044 may correspond, for example, to any of the beam managers illustrated in FIG. 1 or 3-7.

To initiate an FRX beam selection, the FRX beam manager circuitry 1048 may be configured to send a request to the FR2 beam manager circuitry 1046 to receive (or scan) a plurality of FR2 beams to obtain one or more candidate coarse BPLs in FR2. In some examples, the FRX beam manager circuitry 1048 may send the request to the FR2 beam manager circuitry 1046 during initial cell acquisition for FRX, during cell reselection, upon beam failure detection (BFD), or upon receiving a request from a base station to perform beam measurements (e.g., to send an L1 measurement report). In some examples, the FR2 beam manager circuitry 1046 may not have an active session at the time the FRX beam manager circuitry 1048 sends the request to the FR2 beam manager circuitry 1046. In this example, the FR2 beam manager circuitry 1046 may be configured to turn on (e.g., power on using a power source 1040) to perform the FR2 scan and then return to an idle state (e.g., power off using the power source 1040) after performing the FR2 scan.

The FR2 beam manager circuitry 1046 may be configured to use the phase-shifter 1016 to control one or more antenna arrays 1030 (e.g., FR2 antenna arrays) to scan a plurality of FR2 SSB transmit beams from one or more neighboring base stations (e.g., one or more FR2 TRPs of one or more base stations) on a plurality of FR2 receive beams. In some examples, the FR2 beam manager circuitry 1046 may scan the FR2 beams during a time window configured for the UE to perform FR2-assisted beam management for FRX. The FR2 beam manager circuitry 702 may then select one or more candidate coarse BPLs 1020 in FR2 (e.g., by maximal RSRP). The selected candidate coarse BPLs 1020 are associated with FR2 TRPs collocated with FRX TRPs, as determined from the collocation indication included in the SSBs or received via RRC messages. The selected candidate FR2 BPL(s) 1020 may then be stored, for example, in memory 1005 for use by the FR2 beam manager circuitry 1046 in generating and sending a report to the FRX beam manager circuitry 1048 indicating the selected coarse FR2 BPL(s) 1020.

The FRX beam manager circuitry 1048 may then be configured to use the phase-shifter 1016 to control one or more antenna arrays 1030 (e.g., FRX antenna arrays) to perform a fine beam scan using the report. For example, the FRX beam manager circuitry 1048 may receive (or scan) a plurality of narrower FRX transmit beams from one or more neighboring base stations (e.g., one or more FRX TRPs of one or more base stations) associated with the selected coarse FR2 BPL(s) 1020 on a plurality of FRX receive beams. Each of the scanned FRX transmit beams may have a spatial direction that is within a spatial direction of one of the selected FR2 transmit beams. In addition, each of the scanned FRX receive beams may have a spatial direction that is within a spatial direction of one of the selected FR2 receive beams. For example, the FRX beam manager circuitry 1048 may scan FRX transmit beams from an FRX TRP that have a same spatial direction as an FR2 transmit beam from a collocated FR2 TRP.

The FRX beam manager circuitry 1048 may then be configured to select one or more fine BPLs 1022 in FRX (e.g., by maximal RSRP). The selected FRX BPL(s) 1022 may be stored, for example, in memory 1005 for use by the FRX beam manager circuitry 1048 and communication and processing circuitry 1042 for communication on the selected FRX BPL(s) in FRX. The beam manager circuitry 1044 may further be configured to execute beam manager instructions 1054 (e.g., software) stored in the computer-readable medium 1006 to implement one or more of the functions described herein. In addition, the FR2 beam manager circuitry 1046 may further be configured to execute FR2 beam manager instructions 1056 (e.g., software) stored in the computer-readable medium 1006 to implement one or more of the functions described herein. The FRX beam manager circuitry 1048 may further be configured to execute FRX beam manager instructions 1058 (e.g., software) stored in the computer-readable medium 1006 to implement one or more of the functions described herein.

Figure 11:
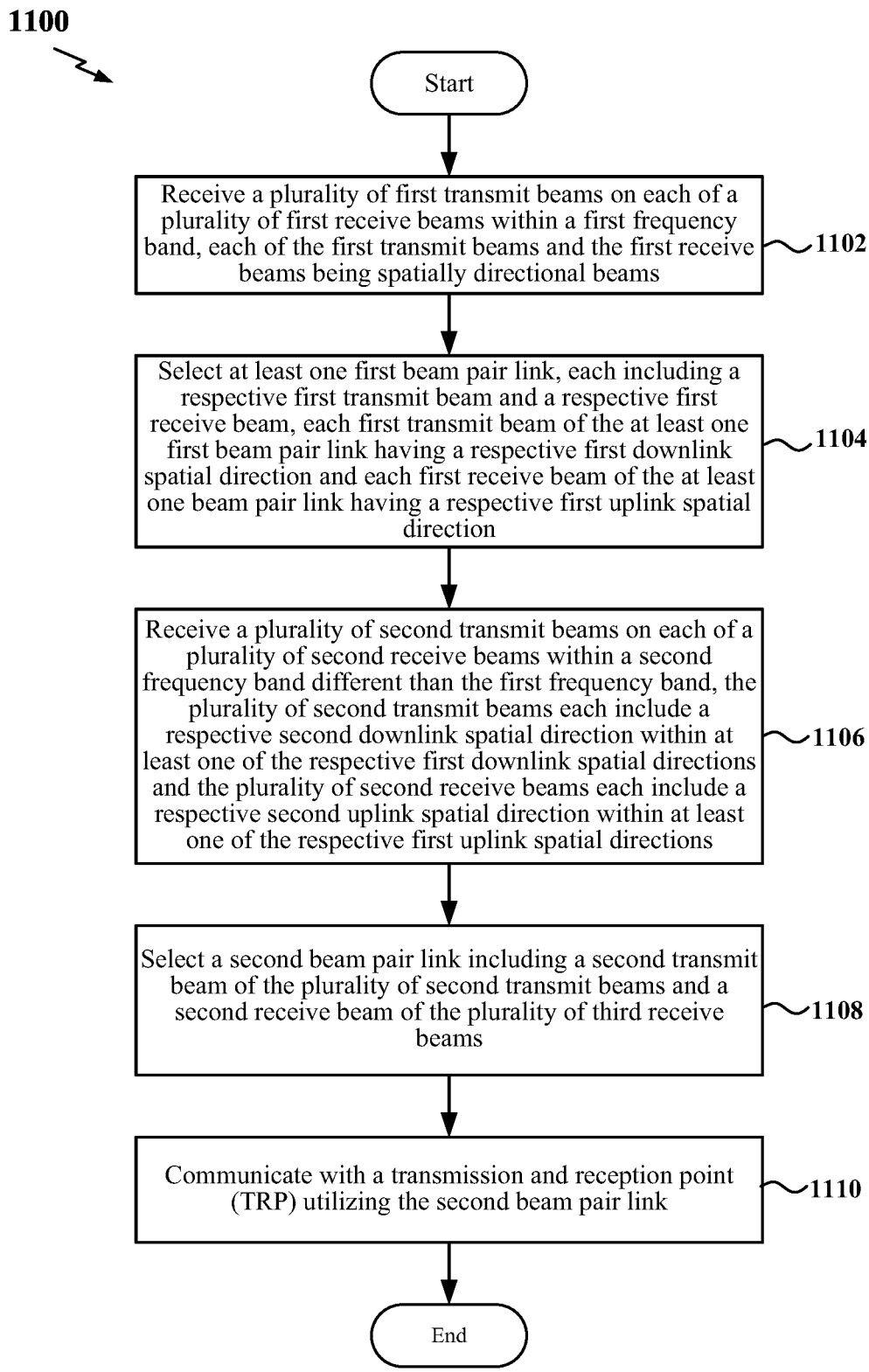
FIG. 11 is a flow chart of an exemplary method for assisted beam management between frequency bands according to some aspects.

FIG. 11 is a flow chart 1100 illustrating an example of a method for assisted beam management between frequency bands according to some aspects. As described below, some or all illustrated features may be omitted in a particular implementation within the scope of the present disclosure, and some illustrated features may not be required for implementation of all aspects. In some examples, the method may be performed by the UE 1000, as described above and illustrated in FIG. 10, by a processor or processing system, or by any suitable means for carrying out the described functions.

At block 1102, the UE may receive a plurality of first transmit beams on each of a plurality of first receive beams within a first frequency band, each of the first transmit beams and the first receive beams being spatially directional beams. In some examples, the UE may be configured to scan the plurality of first transmit beams on the plurality of first receive beams within the first frequency band during a time window configured for the UE to scan the first frequency band for the second frequency band. In some examples, the first frequency band includes FR2 or other spatially directional frequency band. In some examples, the UE may receive a plurality of SSBs on the plurality of first transmit beams. Each of the plurality of SSBs can include a collocated indication indicating whether a respective first TRP that transmitted the SSB has a collocated second TRP in a second frequency band higher than the first frequency band. For example, the beam manager circuitry 1044, including the FR2 beam manager 1046, together with the transceiver 1010 and antenna array 1030, shown and described above in connection to FIG. 10, may provide a means to scan the plurality of first transmit beams on the plurality of first receive beams within the first frequency band.

At block 1104, the UE may select at least one first beam pair link, each including a respective first transmit beam and a respective first receive beam. Each first transmit beam of the at least one first beam pair link having a respective first downlink spatial direction and each first receive beam of the at least one first beam pair link having a respective first uplink spatial direction. In some examples, the UE may measure a respective received power (e.g., RSRP) of each of the plurality of first transmit beams on each of the plurality of first receive beams and select the at least one first beam pair link based on the measured received power. For example, each first beam pair link of the at least one first beam pair link may have a respective received power higher than other first beam pair links. In some examples, the UE may select the at least one first beam pair link associated with respective SSBs including a collocated indication indicating collocation of respective TRPs in the first and second frequency bands. For example, the beam manager circuitry 1044, including the FR2 beam manager 1046, shown and described above in connection with FIG. 10 may provide a means to select at least one first beam pair link.

At block 1106, the UE may receive a plurality of second transmit beams on a plurality of second receive beams within a second frequency band different than the first frequency band. The plurality of second transmit beams each include a respective second downlink spatial direction within at least one of the respective first downlink spatial directions and the plurality of second receive beams each include a respective second uplink spatial direction within at least one of the respective first uplink spatial directions. In some examples, a respective first beam width of the plurality of first transmit beams and the plurality of first receive beams is wider than a respective second beam width of the plurality of second transmit beams and the plurality of second receive beams. For example, the first frequency band can include FR2 (or other lower spatially directive frequency band) and the second frequency band can include FR4-a or FR4-1, FR4, or FR5 (or other frequency band higher than the first frequency band).

In some examples, the UE may send an internal request to scan a plurality of first transmit beams in a first frequency band and receive an internal report indicating the at least one first beam pair link. For example, the UE may include a first beam manager of the first frequency band and a second beam manager of the second frequency band. The second beam manager may send the internal request to the first beam manager to scan the plurality of first transmit beams at block 1102 and receive the internal report from the first beam manager indicating the at least one first beam pair link. For example, the beam manager circuitry 1044, including the FRX beam manager 1048, together with the transceiver 1010 and antenna array 1030 shown and described above in connection with FIG. 10 may provide a means to scan the plurality of second transmit beams on the plurality of second receive beams.

At 1108, the UE may select a second beam pair link including a second transmit beam of the plurality of second transmit beams and a second receive beam of the plurality of third receive beams. The UE may then use the selected second beam pair link for communication with a base station. For example, the beam manager circuitry 1044, including the FRX beam manager 1048, shown and described above in connection with FIG. 10 may provide a means to select the second beam pair link.

At block 1110, the UE may communicate with a transmission and reception point (TRP) utilizing the second beam pair link. In some examples, the UE may communicate with two or more first TRPs in the first frequency band and two or more second TRPs in the second frequency band. The UE may then select at least one first beam pair link, each including a respective first transmit beam and a respective first receive beam, and each associated with a respective SSB including a collocated indication indicating collocation of a respective second TRP of the two or more second TRPs with a corresponding respective first TRP of the two or more first TRPs. For example, the beam manager circuitry 1044, including the FRX beam manager 1048, together with the communication and processing circuitry 1042 and transceiver 1010, shown and described above in connection with FIG. 10 may provide a means to communicate with the TRP.

Figure 12:
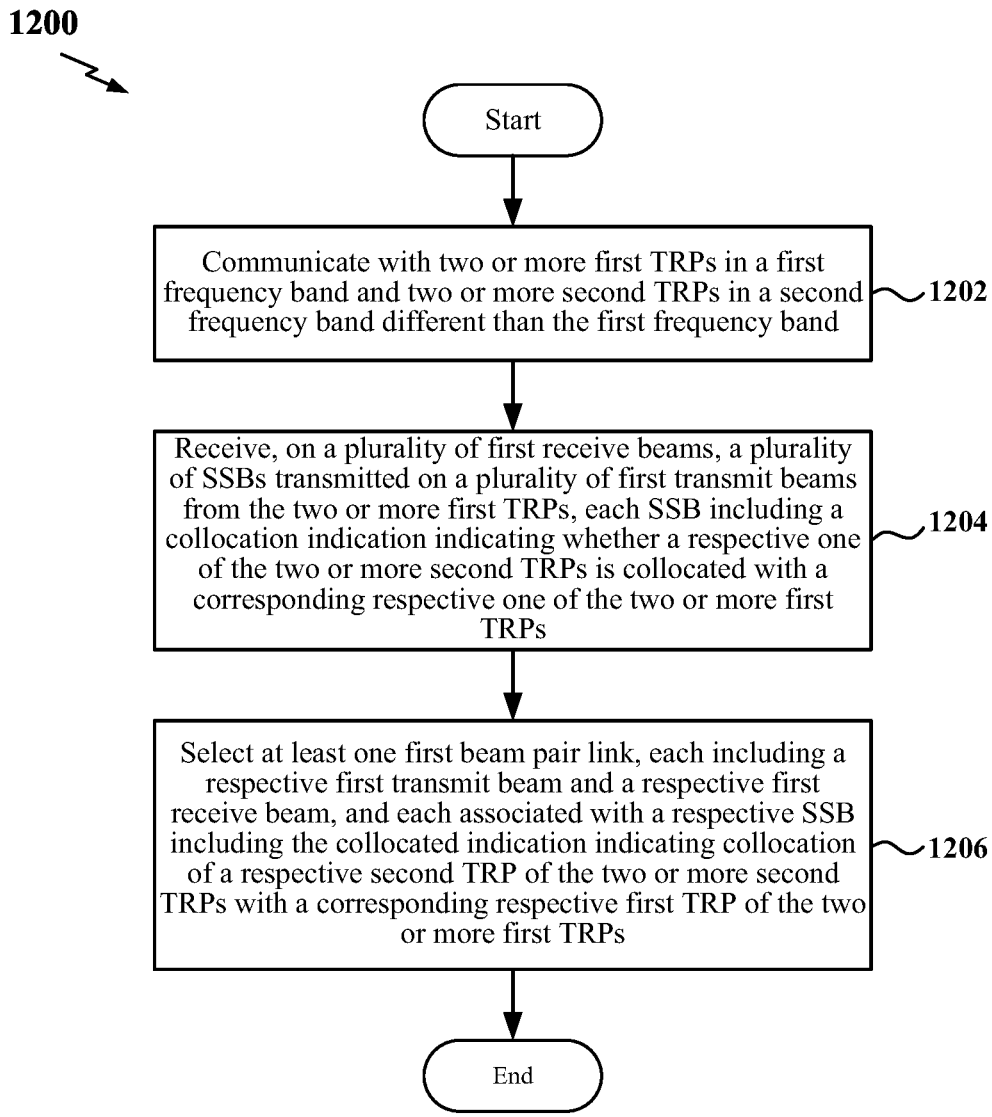
FIG. 12 is a flow chart of another exemplary method for assisted beam management between frequency bands according to some aspects.

FIG. 12 is a flow chart 1200 illustrating another example of a method for assisted beam management between frequency bands according to some aspects. As described below, some or all illustrated features may be omitted in a particular implementation within the scope of the present disclosure, and some illustrated features may not be required for implementation of all aspects. In some examples, the method may be performed by the UE 1000, as described above and illustrated in FIG. 10, by a processor or processing system, or by any suitable means for carrying out the described functions.

At block 1202, the UE may communicate with two or more first TRPs in a first frequency band and two or more second TRPs in a second frequency band different than the first frequency band. For example, the first frequency band may be FR2 (or other spatially directional frequency band) and the second frequency band may be FRX (e.g., FR4-a or FR4-1, FR4, FR5, or other higher frequency band). For example, the communication and processing circuitry 1042 shown and described above in connection with FIG. 10 may provide a means to communicate with the two or more first TRPs and the two or more second TRPs.

At block 1204, the UE may receive, on a plurality of first receive beams, a plurality of SSBs transmitted on a plurality of first transmit beams from the two or more first TRPs. Each SSB can include a collocation indication indicating whether a respective one of the two or more second TRPs is collocated with a corresponding respective one of the two or more first TRPs. Each of the first transmit beams and first receive beams may be spatially directional beams. For example, the communication and processing circuitry 1042, together with the beam manager circuitry 1044, including the FR2 beam manager 1046, shown and described in FIG. 10 may provide a means to receive the plurality of SSBs.

At block 1206, the UE may select at least one first beam pair link, each including a respective first transmit beam and a respective first receive beam. Each selected at least one first beam pair link is further associated with a respective SSB including the collocated indication indicating collocation of a respective second TRP of the two or more second TRPs with corresponding respective first TRP of the two or more first TRPs that transmitted the SSB. For example, the beam manager circuitry 1044, including the FR2 beam manager 1046, shown and described above in connection with FIG. 10 may provide a means to select the at least one first beam pair link.

Figure 13:
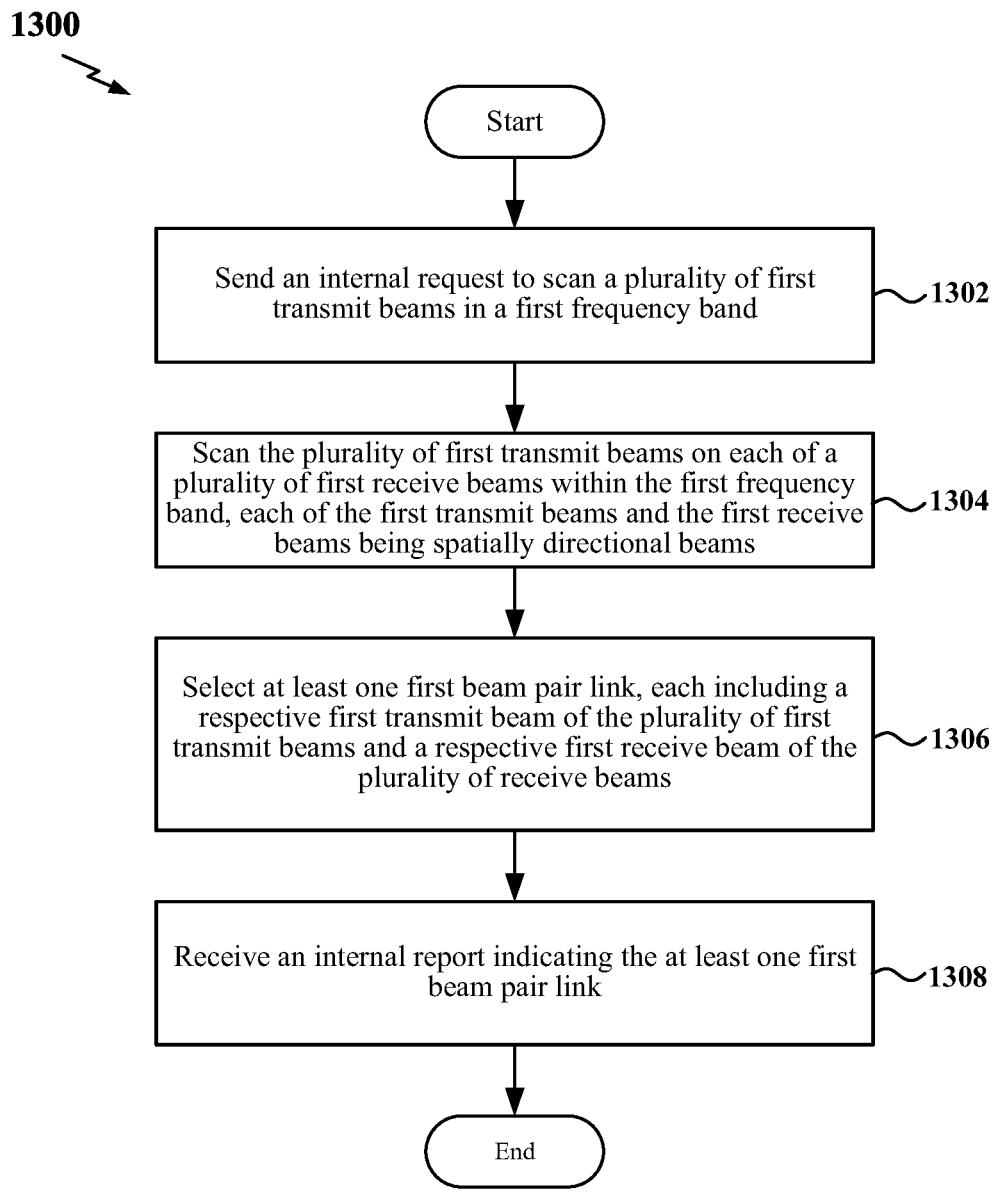
FIG. 13 is a flow chart of another exemplary method for assisted beam management between frequency bands according to some aspects.

FIG. 13 is a flow chart 1300 illustrating another example of a method for assisted beam management between frequency bands according to some aspects. As described below, some or all illustrated features may be omitted in a particular implementation within the scope of the present disclosure, and some illustrated features may not be required for implementation of all aspects. In some examples, the method may be performed by the UE 1000, as described above and illustrated in FIG. 10, by a processor or processing system, or by any suitable means for carrying out the described functions.

At block 1302, the UE may send an internal request to scan a plurality of first transmit beams in a first frequency band. For example, the UE may send the internal request to a first beam manager of a first frequency band from a second beam manager of a second frequency band different than the first frequency band for the first beam manager to scan the plurality of first transmit beams. For example, the first frequency band may be FR2 (or other spatially directional frequency band) and the second frequency band may be FRX (e.g., FR4-a or FR4-1, FR4, FR5, or other higher frequency band). For example, the beam manager circuitry 1044, including the FR2 beam manager 1046 and the FRX beam manager 1048, shown and described above in connection with FIG. 10 may provide a means to send the internal request.

At block 1304, the UE may scan the plurality of first transmit beams on each of a plurality of first receive beams within the first frequency band, where each of the first transmit beams and the first receive beams are spatially directional beams. In some examples, the first beam manager may scan the plurality of first transmit beams. In some examples, the UE may be configured to scan the plurality of first transmit beams on each of the plurality of first receive beams within the first frequency band during a time window configured for the UE to scan the first frequency band for the second frequency band. In some examples, the UE may receive a plurality of SSBs on the plurality of first transmit beams. Each of the plurality of SSBs can include a collocated indication indicating whether a respective first TRP that transmitted the SSB has a collocated second TRP in the second frequency band. For example, the beam manager circuitry 1044, including the FR2 beam manager 1046, shown and described above in connection with FIG. 10 may provide a means to scan the plurality of first transmit beams.

At block 1306, the UE may select at least one first beam pair link. In some examples, the first beam manager may select the at least one first beam pair link. Each beam pair link can include a respective first transmit beam of the plurality of first transmit beams and a respective first receive beam of the plurality of receive beams. Each first transmit beam of the at least one beam pair link has a respective first downlink spatial direction and each first receive beam of the at least one beam pair link has a respective first uplink spatial direction. In some examples, the UE may measure a respective received power (e.g., RSRP) of each of the plurality of first transmit beams on each of the plurality of first receive beams and select the at least one first beam pair link based on the measured received power. For example, each first beam pair link of the at least one first beam pair link may have a respective received power higher than other first beam pair links. In some examples, the UE may select the at least one first beam pair link associated with respective SSBs including a collocated indication indicating collocation of respective TRPs in the first and second frequency bands. For example, the beam manager circuitry 1044, including the FR2 beam manager 1046, shown and described above in connection with FIG. 10 may provide a means to select the at least one first beam pair link.

At block 1308, the UE may receive an internal report indicating the at least one first beam pair link. The at least one first beam pair link may provide coarse candidate beam pair links for FRX. In some examples, the second beam manager may receive the internal report from the first beam manager. For example, the beam manager circuitry 1044, including the FR2 beam manager 1046 and FRX beam manager 1048, shown and described above in connection with FIG. 10 may provide a means to receive the report.

In one configuration, the UE 1000 includes means for performing the various functions and processes described in relation to FIGS. 11-13. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1 and/or 3-7, and utilizing, for example, the processes and/or algorithms described herein in relation to FIGS. 11-13.

For example, an apparatus (e.g., the UE 1000) may include means for receiving a plurality of first transmit beams on each of a plurality of first receive beams within a first frequency band. Each of the plurality of first transmit beams and the plurality of first receive beams are spatially directional beams. The apparatus can further include means for selecting at least one first beam pair link, each including a respective first transmit beam of the plurality of first transmit beams and a respective first receive beam of the plurality of receive beams. Each first transmit beam of the at least one first beam pair link includes a respective first downlink spatial direction and each first receive beam of the at least one first beam pair link includes a respective first uplink spatial direction. The apparatus can further include means for receiving a plurality of second transmit beams on each of a plurality of second receive beams within a second frequency band different than the first frequency band. The plurality of second transmit beams each have a respective second downlink spatial direction within at least one of the respective first downlink spatial directions and the plurality of second receive beams each have a respective second uplink spatial direction within at least one of the respective first uplink spatial directions. The apparatus can further include means for selecting a second beam pair link including a second transmit beam of the plurality of second transmit beams and a second receive beam of the plurality of third receive beams and means for communicating with a transmission and reception point (TRP) utilizing the second beam pair link.

In one aspect, the aforementioned means for receiving the plurality of first transmit beams on each of the plurality of receive beams, means for selecting at least one first beam pair link, means for receiving the plurality of second transmit beams on each of the plurality of second receive beams, means for selecting the second beam pair link, and means for communicating with the TRP utilizing the second beam pair link may be the processor(s) 1004 shown in FIG. 10 configured to perform the functions recited by the aforementioned means. For example, the aforementioned means for receiving the plurality of first transmit beams on each of the plurality of first receive beams may include the beam manager circuitry 1044, including the FR2 beam manager 1046, together with the transceiver 1010 and antenna array 1030 shown in FIG. 10. As another example, the means for selecting the first beam pair link may include the beam manager circuitry 1044, including the FR2 beam manager 1046, shown in FIG. 10. As another example, the means for receiving the plurality of second transmit beams on each of the plurality of second receive beams may include the beam manager circuitry 1044, including the FRX beam manager 1048, together with the transceiver 1010 and antenna array 1030 shown in FIG. 10. As another example, the means for selecting the second beam pair link may include the beam manager circuitry 1044, including the FRX beam manager 1048, shown in FIG. 10. In another aspect, the aforementioned means may be a circuit or any apparatus configured to perform the functions recited by the aforementioned means. As another example, the means for communicating with the TRP utilizing the second beam pair link may include the beam manager circuitry 1044, including the FRX beam manager 1048, together with the communication and processing circuitry 1042 and transceiver, shown in FIG. 10.

The following provides an overview of aspects of the present disclosure.

Aspect 1: A method for wireless communication at a user equipment (UE) in a wireless communication network, the method comprising: receiving a plurality of first transmit beams on each of a plurality of first receive beams within a first frequency band, wherein each of the plurality of first transmit beams and the plurality of first receive beams are spatially directional beams; selecting at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction; receiving a plurality of second transmit beams on a plurality of second receive beams within a second frequency band different than the first frequency band, wherein the plurality of second transmit beams each comprises a respective second downlink spatial direction within at least one of the respective first downlink spatial directions and the plurality of second receive beams each comprises a respective second uplink spatial direction within at least one of the respective first uplink spatial directions; selecting a second beam pair link comprising a second transmit beam of the plurality of second transmit beams and a second receive beam of the plurality of third receive beams; and communicating with a transmission and reception point (TRP) utilizing the second beam pair link.

Aspect 2: The method of aspect 1, wherein the selecting the at least one first beam pair link further comprises: measuring a respective received power of each of the plurality of first transmit beams on each of the plurality of first receive beams; and selecting the at least one first beam pair link based on the received power.

Aspect 3: The method of aspect 2, wherein each first beam pair link of the at least one first beam pair link comprises a respective received power higher than other first beam pair links.

Aspect 4: The method of any one of aspects 1 through 3, wherein the plurality of first transmit beams are associated with two or more first transmission and reception points (TRPs), and the plurality of second transmit beams are associated with two or more second TRPs.

Aspect 5: The method of aspect 4, wherein the receiving the plurality of first transmit beams further comprises: receiving a plurality of synchronization signal blocks (SSBs) on the plurality of first transmit beams.

Aspect 6: The method of aspect 5, wherein each of the plurality of SSBs comprises a collocated indication indicating whether a respective one of the two or more second TRPs is collocated with a corresponding respective one of the two or more first TRPs.

Aspect 7: The method of aspect 6, wherein the selecting the at least one first beam pair link further comprises: selecting the at least one first beam pair link associated with respective SSBs of the plurality of SSBs comprising the collocated indication indicating collocation of respective second TRPs of the two or more second TRPs with corresponding respective first TRPs of the two or more first TRPs.

Aspect 8: The method of any of aspects 1 through 7, further comprising: sending an internal request to scan the plurality of first transmit beams to identify the at least one first beam pair link; and receiving an internal report indicating the at least one first beam pair link.

Aspect 9: The method of any of aspects 1 through 8, wherein a respective first beam width of the plurality of first transmit beams and the plurality of first receive beams is wider than a respective second beam width of the plurality of second transmit beams and the plurality of second receive beams.

Aspect 10: The method of any of aspects 1 through 9, wherein the first frequency band comprises FR2 and the second frequency band comprises FR4-a or FR4-1, FR4 or FR5.

Aspect 11: The method of any of aspects 1 through 10, wherein the receiving the plurality of first transmit beams on each of the plurality of first receive beams within the first frequency band further comprises: receiving the plurality of first transmit beams on the plurality of first receive beams within the first frequency band during a time window configured for the UE to scan the first frequency band for the second frequency band.

Aspect 12: A user equipment (UE) configured for wireless communication comprising a processor, and a memory coupled to the processor, the processor and memory configured to perform a method of any one of aspects 1 through 11.

Aspect 13: An apparatus configured for wireless communication comprising at least one means for performing a method of any one of aspects 1 through 11.

Aspect 14: A non-transitory computer-readable medium storing computer-executable code, comprising code for causing an apparatus to perform a method of any one of aspects 1 through 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-7, and/or 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE), the method comprising:
    receiving a plurality of first transmit beams on each of a plurality of first receive beams within a first frequency band during a time window configured for the UE to scan the first frequency band for a second frequency band different than the first frequency band, wherein each of the plurality of first transmit beams and the plurality of first receive beams are spatially directional beams;
    selecting at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction;
    receiving a plurality of second transmit beams on each of a plurality of second receive beams within the second frequency band, wherein the plurality of second transmit beams each comprises a respective second downlink spatial direction within at least one of the respective first downlink spatial directions and the plurality of second receive beams each comprises a respective second uplink spatial direction within at least one of the respective first uplink spatial directions;
    selecting a second beam pair link comprising a second transmit beam of the plurality of second transmit beams and a second receive beam of the plurality of second receive beams; and
    communicating with a transmission and reception point (TRP) utilizing the second beam pair link.

2. The method of claim 1, wherein the selecting the at least one first beam pair link further comprises:
    measuring a respective received power of each of the plurality of first transmit beams on each of the plurality of first receive beams; and selecting the at least one first beam pair link based on the respective received power of each of the plurality of first transmit beams.

3. The method of claim 2, wherein the respective received power of each first beam pair link of the at least one first beam pair link is higher than other first beam pair links.

4. The method of claim 1, wherein the plurality of first transmit beams are associated with two or more first transmission and reception points (TRPs), and the plurality of second transmit beams are associated with two or more second TRPs.

5. The method of claim 4, wherein the receiving the plurality of first transmit beams further comprises:
receiving a plurality of synchronization signal blocks (SSBs) on the plurality of first transmit beams.

6. The method of claim 5, wherein each of the plurality of SSBs comprises a collocated indication indicating whether a respective one of the two or more second TRPs is collocated with a corresponding respective one of the two or more first TRPs.

7. The method of claim 6, wherein the selecting the at least one first beam pair link further comprises:
selecting the at least one first beam pair link associated with respective SSBs of the plurality of SSBs comprising the collocated indication indicating collocation of respective second TRPs of the two or more second TRPs with corresponding respective first TRPs of the two or more first TRPs.

8. The method of claim 1, further comprising:
sending an internal request to scan the plurality of first transmit beams to identify the at least one first beam pair link; and
receiving an internal report indicating the at least one first beam pair link.

9. The method of claim 1, wherein a respective first beam width of the plurality of first transmit beams and the plurality of first receive beams is wider than a respective second beam width of the plurality of second transmit beams and the plurality of second receive beams.

10. The method of claim 1, wherein the first frequency band comprises frequency range (FR) 2 (FR2) and the second frequency band comprises one of FR4, or FR5, or FR4-a or FR4-1.

11. An apparatus configured for wireless communication at a user equipment (UE), comprising:
one or more processors; and
one or more memories coupled to the one or more processors,
wherein the one or more processors are configured to:
receive a plurality of first transmit beams on each of a plurality of first receive beams within a first frequency band during a time window configured for the UE to scan the first frequency band for a second frequency band different than the first frequency band, wherein each of the plurality of first transmit beams and the plurality of first receive beams are spatially directional beams;
select at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction;
receive a plurality of second transmit beams on each of a plurality of second receive beams within the second frequency band, wherein the plurality of second transmit beams each comprises a respective second downlink spatial direction within at least one of the respective first downlink spatial directions and the plurality of second receive beams each comprises a respective second uplink spatial direction within at least one of the respective first uplink spatial directions;
select a second beam pair link comprising a second transmit beam of the plurality of second transmit beams and a second receive beam of the plurality of second receive beams; and
communicate with a transmission and reception point (TRP) utilizing the second beam pair link.

12. The apparatus of claim 11, wherein the one or more processors are further configured to:
measure a respective received power of each of the plurality of first transmit beams on each of the plurality of first receive beams; and
select the at least one first beam pair link based on the received power.

13. The apparatus of claim 12, wherein the respective received power of each first beam pair link of the at least one first beam pair link is higher than other first beam pair links.

14. The apparatus of claim 11, wherein the plurality of first transmit beams are associated with two or more first transmission and reception points (TRPs), and the plurality of second transmit beams are associated with two or more second TRPs.

15. The apparatus of claim 14, further comprising:
one or more transceivers coupled to the one or more processors,
wherein the one or more processors are further configured to:
receive a plurality of synchronization signal blocks (SSBs) on the plurality of first transmit beams via the transceiver, wherein each of the plurality of SSBs comprises a collocated indication indicating whether a respective one of the two or more second TRPs is collocated with a corresponding respective one of the two or more first TRPs.

16. The apparatus of claim 15, wherein the one or more processors are further configured to:
select the at least one first beam pair link associated with respective SSBs of the plurality of SSBs comprising the collocated indication indicating collocation of respective second TRPs of the two or more second TRPs with corresponding respective first TRPs of the two or more first TRPs.

17. The apparatus of claim 11, wherein the one or more processors are further configured to:
send a request to a first beam manager of the first frequency band in the UE from a second beam manager of the second frequency band in the UE for the first beam manager to scan the plurality of first transmit beams to identify the at least one first beam pair link; and
receive a report at the second beam manager from the first beam manager indicating the at least one first beam pair link.

18. The apparatus of claim 11, wherein a respective first beam width of the plurality of first transmit beams and the plurality of first receive beams is wider than a respective second beam width of the plurality of second transmit beams and the plurality of second receive beams.

19. The apparatus of claim 11, wherein the first frequency band comprises frequency range (FR) 2 (FR2) and the second frequency band comprises one of FR4, or FR5, or FR4-a or FR4-1.

20. An apparatus configured for wireless communication, comprising:
   means for receiving a plurality of first transmit beams on each of a plurality of first receive beams within a first frequency band during a time window configured for the UE to scan the first frequency band for a second frequency band different than the first frequency band, wherein each of the plurality of first transmit beams and the plurality of first receive beams are spatially directional beams;
   means for selecting at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction;
   means for receiving a plurality of second transmit beams on each of a plurality of second receive beams within the second frequency band, wherein the plurality of second transmit beams each comprise a respective second downlink spatial direction within at least one of the respective first downlink spatial directions and the plurality of second receive beams each comprise a respective second uplink spatial direction within at least one of the respective first uplink spatial directions;
   means for selecting a second beam pair link comprising a second transmit beam of the plurality of second transmit beams and a second receive beam of the plurality of second receive beams; and
   means for communicating with a transmission and reception point (TRP) utilizing the second beam pair link.

21. The apparatus of claim 20, wherein the means for selecting the at least one first beam pair link further comprises:
   means for measuring a respective received power of each of the plurality of first transmit beams on each of the plurality of first receive beams; and
   means for selecting the at least one first beam pair link based on the received power, wherein the respective received power of each first beam pair link of the at least one first beam pair link is higher than other first beam pair links.

22. The apparatus of claim 20, wherein the plurality of first transmit beams are associated with two or more first transmission and reception points (TRPs), and the plurality of second transmit beams are associated with two or more second TRPs.

23. The apparatus of claim 22, wherein the means for receiving the plurality of first transmit beams further comprises:
   means for receiving a plurality of synchronization signal blocks (SSBs) on the plurality of first transmit beams, wherein each of the plurality of SSBs comprises a collocated indication indicating whether a respective one of the two or more second TRPs is collocated with a corresponding respective one of the two or more first TRPs.

24. The apparatus of claim 23, wherein the means for selecting the at least one first beam pair link further comprises:
   means for selecting the at least one first beam pair link associated with respective SSBs of the plurality of SSBs comprising the collocated indication indicating collocation of respective second TRPs of the two or more second TRPs with corresponding respective first TRPs of the two or more first TRPs.

25. The apparatus of claim 20, further comprising:
   means for sending an internal request to scan the plurality of first transmit beams to identify the at least one first beam pair link; and
   means for receiving an internal report indicating the at least one first beam pair link.

26. The apparatus of claim 20, wherein a respective first beam width of the plurality of first transmit beams and the plurality of first receive beams is wider than a respective second beam width of the plurality of second transmit beams and the plurality of second receive beams.

27. The apparatus of claim 20, wherein the first frequency band comprises frequency range (FR) 2 (FR2) and the second frequency band comprises one of FR4, or FR5, or FR4-a or FR4-1.

28. A non-transitory computer-readable medium having stored therein instructions executable by one or more processors of a user equipment (UE) to:
   receive a plurality of first transmit beams on each of a plurality of first receive beams within a first frequency band during a time window configured for the UE to scan the first frequency band for a second frequency band different than the first frequency band, wherein each of the plurality of first transmit beams and the plurality of first receive beams are spatially directional beams;
   select at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction;
   receive a plurality of second transmit beams on each of a plurality of second receive beams within the second frequency band, wherein the plurality of second transmit beams each comprises a respective second downlink spatial direction within at least one of the respective first downlink spatial directions and the plurality of second receive beams each comprises a respective second uplink spatial direction within at least one of the respective first uplink spatial directions;
   select a second beam pair link comprising a second transmit beam of the plurality of second transmit beams and a second receive beam of the plurality of second receive beams; and
   communicate with a transmission and reception point (TRP) utilizing the second beam pair link.

29. The non-transitory computer-readable medium of claim 28, wherein the plurality of first transmit beams are associated with two or more first transmission and reception points (TRPs), and the plurality of second transmit beams are associated with two or more second TRPs.

30. The non-transitory computer-readable medium of claim 29, further comprising instructions executable by one or more processors of the UE to:
   receive a plurality of synchronization signal blocks (SSBs) on the plurality of first transmit beams, wherein each of the plurality of SSBs comprises a collocated indication indicating whether a respective one of the two or more second TRPs is collocated with a corresponding respective one of the two or more first TRPs.

31. The non-transitory computer-readable medium of claim 29, further comprising instructions executable by one or more processors of the UE to:
select the at least one first beam pair link associated with respective SSBs of the plurality of SSBs comprising the collocated indication indicating collocation of respective second TRPs of the two or more second TRPs with corresponding respective first TRPs of the two or more first TRPs.

32. The non-transitory computer-readable medium of claim 28, wherein a respective first beam width of the plurality of first transmit beams and the plurality of first receive beams is wider than a respective second beam width of the plurality of second transmit beams and the plurality of second receive beams.

33. An apparatus configured for wireless communication at a user equipment (UE), comprising:
one or more processors; and
one or more memories coupled to the one or more processors, the one or more processors being configured to:
receive a plurality of synchronization signal blocks (SSBs) of a plurality of first transmit beams on each of a plurality of first receive beams within a first frequency band, wherein each of the plurality of first transmit beams and the plurality of first receive beams are spatially directional beams;
select at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction;
receive a plurality of second transmit beams on each of a plurality of second receive beams within a second frequency band different than the first frequency band, wherein the plurality of second transmit beams each comprises a respective second downlink spatial direction within at least one of the respective first downlink spatial directions;
select a second beam pair link comprising a second transmit beam of the plurality of second transmit beams and a second receive beam of the plurality of second receive beams; and
communicate with a transmission and reception point (TRP) utilizing the second beam pair link;
wherein the plurality of first transmit beams are associated with two or more first transmission and reception points (TRPs), and the plurality of second transmit beams are associated with two or more second TRPs,
wherein each of the plurality of SSBs comprises a collocated indication indicating whether a respective one of the two or more second TRPs is collocated with a corresponding respective one of the two or more first TRPs.

34. The apparatus of claim 33, wherein the one or more processors are further configured to:
select the at least one first beam pair link associated with respective SSBs of the plurality of SSBs comprising the collocated indication indicating collocation of respective second TRPs of the two or more second TRPs with corresponding respective first TRPs of the two or more first TRPs.

35. The apparatus of claim 33, wherein the first frequency band comprises frequency range (FR) 2 (FR2) and the second frequency band comprises one of FR4, or FR5, or FR4-a or FR4-1.

36. A method for wireless communication at a user equipment (UE), the method comprising:
receiving a plurality of synchronization signal blocks (SSBs) of a plurality of first transmit beams on each of a plurality of first receive beams within a first frequency band, wherein each of the plurality of first transmit beams and the plurality of first receive beams are spatially directional beams;
selecting at least one first beam pair link, each comprising a respective first transmit beam of the plurality of first transmit beams and a respective first receive beam of the plurality of receive beams, wherein each first transmit beam of the at least one first beam pair link comprises a respective first downlink spatial direction and each first receive beam of the at least one first beam pair link comprises a respective first uplink spatial direction;
receiving a plurality of second transmit beams on each of a plurality of second receive beams within a second frequency band different than the first frequency band, wherein the plurality of second transmit beams each comprises a respective second downlink spatial direction within at least one of the respective first downlink spatial directions;
selecting a second beam pair link comprising a second transmit beam of the plurality of second transmit beams and a second receive beam of the plurality of second receive beams; and
communicating with a transmission and reception point (TRP) utilizing the second beam pair link;
wherein the plurality of first transmit beams are associated with two or more first transmission and reception points (TRPs), and the plurality of second transmit beams are associated with two or more second TRPs,
wherein each of the plurality of SSBs comprises a collocated indication indicating whether a respective one of the two or more second TRPs is collocated with a corresponding respective one of the two or more first TRPs.

37. The method of claim 36, wherein the selecting the at least one first beam pair link further comprises:
selecting the at least one first beam pair link associated with respective SSBs of the plurality of SSBs comprising the collocated indication indicating collocation of respective second TRPs of the two or more second TRPs with corresponding respective first TRPs of the two or more first TRPs.

38. The method of claim 36, wherein the first frequency band comprises frequency range (FR) 2 (FR2) and the second frequency band comprises one of FR4, or FR5, or FR4-a or FR4-1.

* * * * *